United States Patent
Wang et al.

(10) Patent No.: US 10,216,668 B2
(45) Date of Patent: Feb. 26, 2019

(54) TECHNOLOGIES FOR A DISTRIBUTED HARDWARE QUEUE MANAGER

(71) Applicant: Intel Corporation, Santa Clara, CA (US)

(72) Inventors: Ren Wang, Portland, OR (US); Yipeng Wang, Beaverton, OR (US); Jr-Shian Tsai, Portland, OR (US); Andrew Herdrich, Hillsboro, OR (US); Tsung-Yuan Tai, Portland, OR (US); Niall McDonnell, Limerick (IE); Stephen Van Doren, Portland, OR (US); David Sonnier, Austin, TX (US); Debra Bernstein, Sudbury, MA (US); Hugh Wilkinson, Newton, MA (US); Narender Vangati, Austin, TX (US); Stephen Miller, Round Rock, TX (US); Gage Eads, Austin, TX (US); Andrew Cunningham, Ennis (IE); Jonathan Kenny, Co. Tipperary (IE); Bruce Richardson, Sixmilebridge (IE); William Burroughs, Macungie, PA (US); Joseph Hasting, Orefield, PA (US); An Yan, Orefield, PA (US); James Clee, Orefield, PA (US); Te Ma, Allentown, PA (US); Jerry Pirog, Easton, PA (US); Jamison Whitesell, Bethlehem, PA (US)

(73) Assignee: Intel Corporation, Santa Clara, CA (US)

( * ) Notice: Subject to any disclaimer, the term of this patent is extended or adjusted under 35 U.S.C. 154(b) by 212 days.

(21) Appl. No.: 15/087,154

(22) Filed: Mar. 31, 2016

(65) Prior Publication Data
US 2017/0286337 A1    Oct. 5, 2017

(51) Int. Cl.
*G06F 13/24*    (2006.01)
*G06F 13/36*    (2006.01)
(Continued)

(52) U.S. Cl.
CPC .......... *G06F 13/36* (2013.01); *G06F 12/1027* (2013.01); *G06F 13/24* (2013.01);
(Continued)

(58) Field of Classification Search
None
See application file for complete search history.

(56) References Cited

U.S. PATENT DOCUMENTS 7,433,364 B2 *   10/2008   Chandra ............... G06F 13/128
                                                            370/235
7,774,374 B1 *   8/2010    Kizhepat .............. H04L 49/101
                                                            707/800

(Continued)

OTHER PUBLICATIONS

International search report in PCT application No. PCT/US2017/020230, dated Jun. 2, 2017 (3 pages).

(Continued)

*Primary Examiner* — Elias Mamo
(74) *Attorney, Agent, or Firm* — Barnes & Thornburg LLP

(57) ABSTRACT

Technologies for a distributed hardware queue manager include a compute device having a processor. The processor includes two or more hardware queue managers as well as two or more processor cores. Each processor core can enqueue or dequeue data from the hardware queue manager. Each hardware queue manager can be configured to contain several queue data structures. In some embodiments, the queues are addressed by the processor cores using virtual queue addresses, which are translated into physical queue addresses for accessing the corresponding hardware queue manager. The virtual queues can be moved from one physi- (Continued)

cal queue in one hardware queue manager to a different physical queue in a different physical queue manager without changing the virtual address of the virtual queue.

29 Claims, 13 Drawing Sheets

(51) Int. Cl.
 *G06F 13/40* (2006.01)
 *G06F 12/1027* (2016.01)
(52) U.S. Cl.
 CPC ...... *G06F 13/4004* (2013.01); *G06F 2212/50* (2013.01); *G06F 2212/68* (2013.01)

(56) References Cited

U.S. PATENT DOCUMENTS

| | | | | |
|---|---|---|---|---|
| 8,155,134 | B2* | 4/2012 | Fairhurst | H04L 49/90 370/235 |
| 8,918,791 | B1* | 12/2014 | Chudgar | G06F 9/526 718/102 |
| 9,015,376 | B2* | 4/2015 | Denio | G06F 9/546 709/237 |
| 2002/0010732 | A1 | 1/2002 | Matsui et al. | |
| 2002/0188648 | A1 | 12/2002 | Aweya et al. | |
| 2003/0182464 | A1* | 9/2003 | Hamilton | G06F 9/546 719/314 |
| 2014/0122735 | A1* | 5/2014 | Jokinen | H04L 47/621 709/231 |
| 2015/0339168 | A1 | 11/2015 | Mason | |

OTHER PUBLICATIONS

Written opinion in PCT application No. PCT/US2017/020230, dated Jun. 2, 2017 (9 pages).
U.S. Appl. No. 14/987,676 by Ren Wang et al., filed Jan. 4, 2016.
S. Lee, D. Tiwari, Y. Solihin, and J. Tuck, "Haqu: Hardware-accelerated queueing for fine-grained threading on a chip multiprocessor," Proc. 17th Intl. Symp. on High Performance Computer Architecture, 2011.
Data Plane Development Kit: Programmer's Guide. Technical report, Intel Corp., 2015.
QorIQ DPAA Primer for Software Architecture. Technical report, Freescale Semiconductor Inc., 2012.
J. Park, R. M. Yoo, D. S. Khudia, C. J. Hughes, and D. Kim, "Location-aware cache management for many-core processors with deep cache hierarchy," Proc. Intl. Conf. on High Performance Computing, Networking, Storage, and Analysis, 2013.

* cited by examiner

TECHNOLOGIES FOR A DISTRIBUTED HARDWARE QUEUE MANAGER

BACKGROUND

Communication between cores in a multi-core processor is an important parameter in many computer applications such as packet processing, high-performance computing, and machine learning. On a general-purpose platform, shared memory space managed by software is often employed to realize inter-core communication. As the number of cores increases, communication between the cores may become a limiting factor for performance scaling in certain scenarios.

The above-described problem is magnified in architectures having a large number of cores, as additional overhead is required to manage communication among all of the cores, leading to high latency and low throughput. The overhead in such an environment includes software overhead related to maintaining the data structure in memory and flow control, as well as hardware overhead to maintain cache memory coherence.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
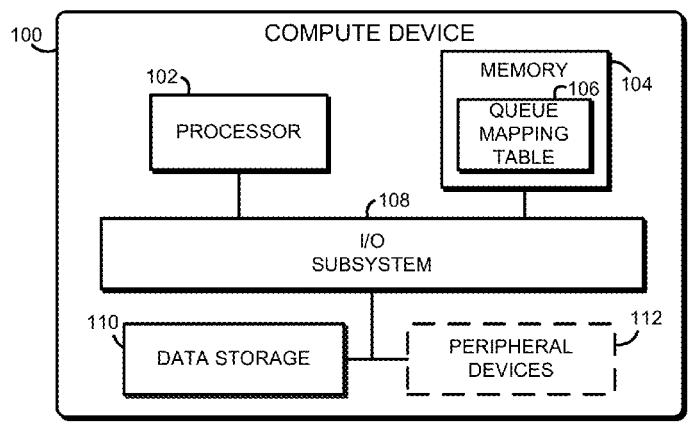
FIG. 1 is a simplified diagram of at least one embodiment of a compute device including a processor.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 2:
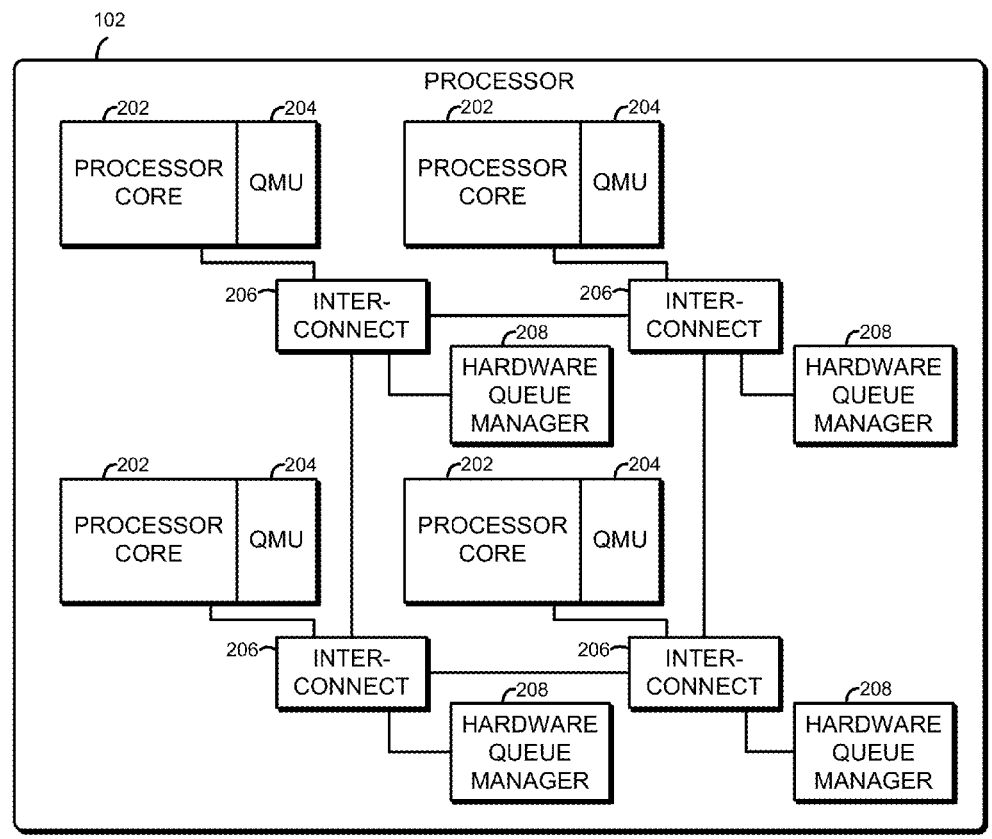
FIG. 2 is a simplified diagram of at least one embodiment of the processor of FIG. 1 including several processor cores and several hardware queue managers.

Referring now to FIGS. 1 and 2, an illustrative compute device 100 includes a processor 102, which includes two or more processor cores 202 and two or more hardware queue managers 208 connected by interconnect circuitry 206 (see FIG. 2). In use, as described in more detail below, an instruction of a software program may be executed by one of the processor cores 202, which may instruct that processor core 202 to enqueue data to a queue of one of the HQMs 208. The software instruction includes a queue address indicating to which HQM 208 the data should be sent. In the illustrative embodiment, the address of the instruction is a virtual address, which is translated to a physical address by a QMU 204 associated with the processor core 202 executing the instruction. The processor core 202 sends the data through the interconnect circuitry 206 to the destination HQM 208, which stores the data in a queue data structure of the HQM 208. At some later time, an instruction of the software program may instruct a processor core 202 (which may be a different processor core 202 from the enqueuing one) to dequeue the data from the HQM 208. After translation of a virtual address in the command to a physical address by the associated QMU 204, the dequeue request is sent to the HQM 208, which then removes the data from the queue data structure, and sends it to the dequeuing processor core 202.

The software program may be embodied as any type of software program for which enqueuing and/or dequeuing is useful as described in more detail below. In the illustrative embodiment, the software program may include virtualized network functions, and the enqueuing and dequeuing may allow for fast transfer and processing of packets of network communication, wherein different processor cores 202 of the processor 102 perform different virtualized network functions.

The compute device 100 may be embodied as any type of compute device capable of performing the functions described herein. For example, the compute device 100 may be embodied as or otherwise be included in, without limitation, a desktop computer, a server computer, an embedded computing system, a System-on-a-Chip (SoC), a smartphone, a cellular phone, a wearable computer, a tablet computer, a notebook computer, a laptop computer, a handset, a messaging device, a camera device, a multiprocessor system, a processor-based system, a consumer electronic device, and/or any other compute device. The illustrative compute device 100 includes the processor 102, a memory 104 including a queue mapping table 106, an I/O subsystem 108, and data storage 110.

The processor 102 may be embodied as any type of processor capable of performing the functions described herein. For example, the processor 102 may be embodied as a digital signal processor, a microcontroller, a field programmable gate array (FPGA), or other processor or processing/controlling circuit. Similarly, the memory 104 may be embodied as any type of volatile, non-volatile, or hybrid (i.e., containing both volatile and non-volatile components) memory or data storage capable of performing the functions described herein. In operation, the memory 104 may store various data and software used during operation of the compute device 100 such as operating systems, applications, programs, libraries, and drivers. In the illustrative embodiment, the memory includes a queue mapping table 106, discussed in more detail below in regard to FIGS. 7-10. The memory 104 is communicatively coupled to the processor 102 via the I/O subsystem 108, which may be embodied as circuitry and/or components to facilitate input/output operations with the processor 102, the memory 104, and other components of the compute device 100. For example, the I/O subsystem 108 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 108 may form a portion of a system-on-a-chip (SoC) and be incorporated, along with the processor 102, the memory 104, and other components of the compute device 100 on a single integrated circuit chip.

The data storage 110 may be embodied as any type of device or devices configured for the short-term or long-term storage of data. For example, the data storage 110 may include any one or more memory devices and circuits, memory cards, hard disk drives, solid-state drives, or other non-volatile data storage devices.

Of course, in some embodiments, the compute device 100 may include other or additional components, such as those commonly found in a compute device. For example, the compute device 100 may also have peripheral devices 112 such as a display, keyboard, mouse, speaker, camera, communication circuit, etc.

Referring now to FIG. 2, an illustrative processor 102 of the compute device 100 includes several processor cores 202, each with a corresponding queue mapping unit (QMU) 204 (which is described in more detail below in regard to FIG. 3) and several hardware queue managers (HQMs) 208 (which is described in more detail below in regard to FIG. 7). In the illustrative embodiment, each processor core 202 may communicate with each HQM 208 through interconnect circuitry 206. The interconnect circuitry 206, together with the wires or other electrical connections shown in FIG. 2, is configured to route queue-related communication to and from the processor cores 202 and the HQMs 208. The interconnect circuitry 206 may be embodied as any type of interconnect circuitry, such as a ring, crossbar, or other type of interconnect circuitry. In some embodiments, the interconnect circuitry 206 may be embodied as a special, dedicated circuitry for queue-related communication, or may be embodied as a shared interconnect used for additional communication different from queue-related communication. While the interconnect circuitry 206 is depicted in FIG. 2 as connected to each processor core 202 and each HQM 208, it should be appreciated that any amount or configuration of interconnect circuitry 206 may be used in order to effect the necessary interconnectivity described herein.

The illustrative embodiment shown in FIG. 2 depicts four of each of the processor core 202, QMU 204, and HQM 208. It should be appreciated that, in other embodiments, there could be more or fewer of each component (with corresponding adjustments of the interconnect circuitry 206). For example, an embodiment could have two processor cores 202 and two HQMs 208, and a different embodiment could have 16 processor cores 202 and 16 HQMs 208. Additionally, in some embodiments, there could be more or fewer HQMs 208 than processor cores 202. For example, an embodiment could have 16 processor cores 202 and four HQMs 208. Some embodiments may include any combination of more than 4, 8, 16, 32, or 64 processor cores 202 and/or more than 4, 8, 16, 32, or 64 HQMs 208. In the illustrative embodiment, each processor core 202 has a corresponding QMU 204. In some embodiments, there may be fewer QMUs 204 than processor cores 202, and in other embodiments there may not be any QMUs 204.

In the illustrative embodiment, each processor core 202 is enabled to enqueue to and dequeue from each HQM 208. To do so, each processor core 202 has an instruction in its instruction set for an enqueue instruction and a dequeue instruction. The enqueue instruction includes a queue address and a register address. The register address indicates the register containing the data to be enqueued, and the queue address indicates to which queue in which HQM 208 the data should be enqueued. The dequeue instruction also includes a queue address and a register address. The register address indicates the register to which the data from the queue should be stored, and the queue address indicates from which queue in which HQM 208 the data should be enqueued. In the illustrative embodiment and as described in more detail below, the queue address for the enqueue and dequeue commands is a virtual queue address, and must be translated to a physical queue address using the associated QMU 204. In some embodiments, the queue address may be a physical queue address, and translation by the QMU 204 may not be necessary. The physical queue address indicates which HQM 208 with which the queue is associated as well as the location of the queue in the associated HQM 208.

In additional embodiments, one or more processor cores 202 may not be enabled to enqueue to and dequeue from each HQM 208. For example, some processor cores 202 may only be able to enqueue to one or more HQMs 208, and other processor cores 202 may only be able to dequeue to one or more HQMs 208. In another example, some processor cores 202 may only be able communicate with some of the HQMs 208, and may not be able to directly communicate at all with others of the HQMs 208.

Figure 3:
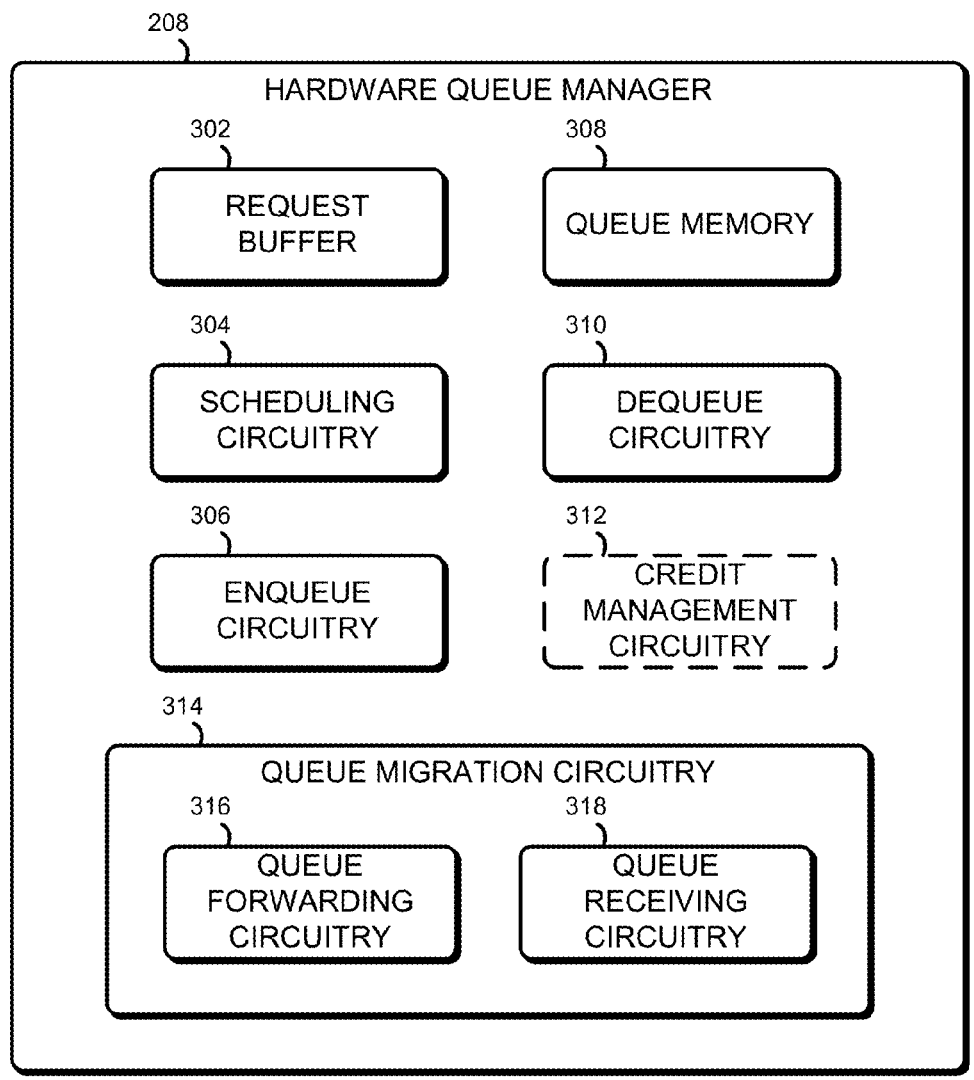
FIG. 3 is a simplified diagrams of at least one embodiment of one of the hardware queue managers of the processor of FIG. 2.

Referring now to FIG. 3, the illustrative HQM 208 includes a request buffer 302, scheduling circuitry 304, enqueue circuitry 306, queue memory 308, dequeue circuitry 310, optional credit management circuitry 312, and queue migration circuitry 314. It should be appreciated that, in some instances, one or more of the components of the HQM 208 may include or otherwise incorporate some of the structure or perform some of the functionality of some of the other components. For example, the queue memory 308 may include or otherwise form a portion of the request buffer 302.

In the illustrative embodiment, when each enqueue command and dequeue command is accepted, it is first stored in the request buffer 302 before being fully processed. The request buffer 302 temporarily stores the incoming requests as the HQM 208 may not have enough resources or bandwidth to serve all the incoming requests at the moment they are received. The request buffer 302 stores the requests in one or more buffers, which may be first in first out (FIFO) queues where the first request into the buffer will be the first request out of the buffer. In one embodiment, a subset of buffers is allocated to store only enqueue requests while another subset is reserved for only dequeue requests. Other ways for allocating the buffers, such as by core, by thread, by request type, etc., may also be used. A single priority level may be assigned across all the buffers to simplify implementation and to maximize throughput. Alternatively, multiple priority levels may be implemented to support fine-grained Quality of Service (QoS) features. For example, given n priorities, every enqueue and dequeue buffer pair may be assigned a different priority such that n buffers are allocated for enqueue requests and n buffers are allocated for dequeue requests. Each incoming request has a priority that is either preassigned by the requesting core/thread or assigned by the HQM 208 upon receipt by the HQM 208. Each request is then stored in a buffer that corresponds to the request's priority and/or type (enqueue or dequeue).

In the illustrative embodiment, an acknowledgement is sent from the hardware queue manager 208 to the processor core 202 which sent the command when the command is added to the request buffer 302. In other embodiments, an acknowledgement may not be sent. In some embodiments, the HQM 208 may not be able to handle every incoming command, and some commands may not be added to the request buffer 302. When a command is not added to the request buffer 302, the HQM 208 may, in some embodiments, send a failure notice to the processor core 202 associated with the command In other embodiments, the HQM 208 may not send a failure notice. In some embodiments, the failure notice may specify the reason for the failure (such as no credit available or request buffer full), and in other embodiments it may not. The failure notice or acknowledgement may be sent to the processor core 202 by any means, such as part of the usual execution of the enqueue/dequeue instruction of the processor core 202 or as an interrupt to the processor core 202. In embodiments without an acknowledgement or failure notice, the situation of a command not being added to the queue may require special consideration in software. In some embodiments, the hardware queue manager 208 may be able to handle every incoming command, making acknowledgement of a command unnecessary.

The scheduling circuitry 304 is configured to determine the order in which the commands in the buffers of the request buffer 302 are processed. The scheduling circuitry 304 has a scheduling policy, which may be configured by software. The scheduling policy may employ round robin, weighted round robin, preemptive priority, and/or a combination of those and other policies.

Each illustrative enqueue command received by the HQM 208 includes data to be stored and a queue address of the hardware queue manager 208 in which to store it, and each illustrative dequeue command received by the HQM 208 includes a queue address of the hardware queue manager 208 from which to retrieve data. When an enqueue command is processed by the enqueue circuitry 306, the data associated with that command is stored in the queue memory 308 in the queue corresponding to the queue address.

The queue memory 308 may be any suitable type of memory. In the illustrative embodiment, the queue memory 308 is SRAM. In other embodiments, the queue memory 308 may be DRAM, flash memory, or other memory type. The queue memory 308 is logically arranged into one or more data queues in queue data structures. Each queue data structure of the queue memory 308 is associated with a different physical queue address. It should be appreciated that the queue data structure is a first-in, first-out (FIFO) data structure that is able to store multiple entries associated with the same physical queue address.

In some embodiments, the size of the entries of different queue data structures may be different. For example, a first queue may accept entries 32 bits in length, while a second queue may accept entries 64 bits in length. In some embodiments, each memory location of the queue memory 308 may be assigned to a specific queue data structure, and each queue data structure may be a fixed maximum size. In other embodiments, the size of one or more queue data structures may be variable, and may take up more or less memory as entries are added and removed from the queue. The configuration of the queues may be determined by software using, e.g., memory-mapped input/output (MMIO). In some embodiments, when there is not enough space available in the queue indicated by the enqueue command, a failure notice (such as an interrupt) may be sent to the processor core 202 which sent the command In other embodiments, the enqueue command may be dropped without any communication sent to the processor core 202 which sent the command.

When a dequeue command is processed by the dequeue circuitry 310, the data at the head of the queue indicated by the dequeue command is removed from that queue and sent to the processor core 202 which sent the dequeue command.

In some embodiments, the optional credit management circuitry 312 operates a credit management system to manage and track a number of credit pools. Through controlling the credits in each credit pool, the credit management circuitry 312 can adjust the rate and frequency at which the incoming requests are sent by the requesting processor cores 202 and threads. The credit management circuitry 312 prevents an overflow of incoming requests that may cause core stalls or request drops. The reduction in the overflow of incoming requests, in turn, may improve the efficiency of both the requesting processor cores 202 and threads, as well as the HQM 208.

Before a core or thread can send an enqueue or dequeue request to the HQM 208, it first acquires the appropriate credit from the credit management circuitry 312. A request received by the HQM 208 without the appropriate credit will be refused acceptance and/or dropped by the HQM 208. In an embodiment, the credit management circuitry 312 maintains a global enqueue credit pool and a global dequeue credit pool. The size of these global credit pools correspond respectively to the total capacity of the HQM for handling incoming enqueue and dequeue requests. The credit management circuitry 312 also maintains a pair of local enqueue and dequeue credit pools for each processor core 202 or thread. The size of each pair of local enqueue and dequeue credit pool correspond to the capacity of the HQM 208 allocated to that particular processor core 202 or thread. The local credit pool may be maintained by each processor core 202 or thread, or alternatively, tracked centrally by the credit management circuitry 312. By controlling the size of each local credit pool and the rate in which they are replenished, the credit management circuitry 312 has fine grain control over the number of enqueue/dequeue requests that are sent by each processor core 202 or thread. For example, the credit management circuitry 312 may implement a credit replenishment policy such as round robin or weighted round robin to decide when and how much to replenish each local credit pool. The credit management circuitry 312 may also retain credits to starve all local credit pools and thus slow down the rate at which the processor cores 202 or threads send requests to help the HQM 208 catch up on pending operations.

The queue migration circuitry 314 is configured to migrate the contents of a queue from one HQM 208 to another. The contents of a queue might be migrated if, for example, a thread accessing the queue gets moved from a processor core 202 close to the HQM 208 to a different processor core 202 farther away from the hardware queue manager 208. In such a situation, the contents of the queue could be moved to a different HQM 208 closer to the different processor core 202.

The queue migration circuitry 314 includes queue forwarding circuitry 316, which is configured to send queue data stored in the HQM 208 to a different HQM 208. In some embodiments, the queue migration circuitry 314 is configured to send inter-process interrupts to each of the processor cores 202 to flush the associated mapping entry in each QMU 204 (the QMU 204 is described in more detail below in regard to FIG. 7). The scheduling circuitry 304 may include in the scheduling policy, in some embodiments, a policy indicating how commands stored in the request buffer 302 associated with the queue being migrated are handled (e.g., they could be handled in the same priority as before the migration was started, they could be handled with a higher priority, or they could be handled with a lower priority). The queue migration circuitry 314 also includes queue receiving circuitry 318 to receive queue entries sent to the HQM 208 from a different HQM 208. In some embodiments, the queue receiving circuitry 318 is configured to trigger an interrupt when the migration is complete.

Figure 4:
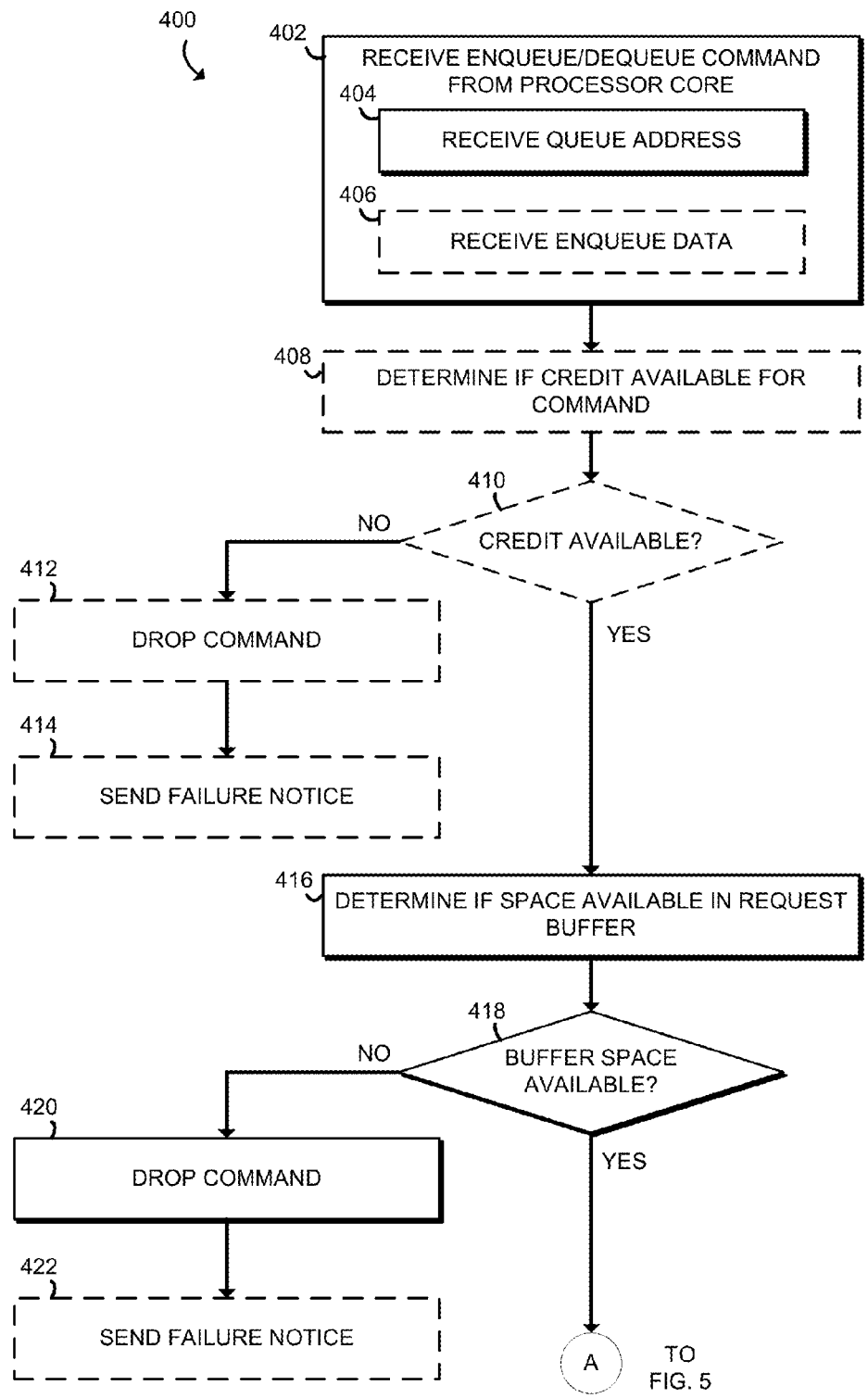
FIGS. 4 and 5 are a simplified flow diagram of at least one embodiment of a method that may be executed by a hardware queue manager of the processor of FIG. 2.

Referring now to FIG. 4, in use, the HQM 208 may execute a method 400 upon receipt of a enqueue or dequeue command. Beginning in block 402, the HQM 208 receives the enqueue or dequeue command from a processor core 202, including receiving the queue address in block 404. If the command is an enqueue command, the HQM 208 also receives enqueue data in block 406.

In optional block 408, in embodiments with the credit management circuitry 312 enabled, the HQM 208 determines if credit is available for the command In block 410, if there is not credit available, the method 400 proceeds to block 412. Otherwise, the method 400 proceeds to block 416. In block 412, the command is dropped since there is no available credit. In block 414, in embodiments in which failure notices are sent, a failure notice is sent to the processor core 202 which sent the command.

In block 416, the HQM 208 determines if there is space available in the request buffer 302. In block 418, if there is no buffer space available, the method 400 proceeds to block 420. Otherwise, the method 400 proceeds to block 422 of FIG. 5. In block 420, the command is dropped since there is no available space in the buffer. In block 422, in embodiments in which failure notices are sent, a failure notice is sent to the processor core 202 which sent the command In embodiments in which there are sufficient resources to process every request immediately, it may not be necessary to store the command in the request buffer 302, and blocks 416 and 418 may be skipped.

Figure 5:
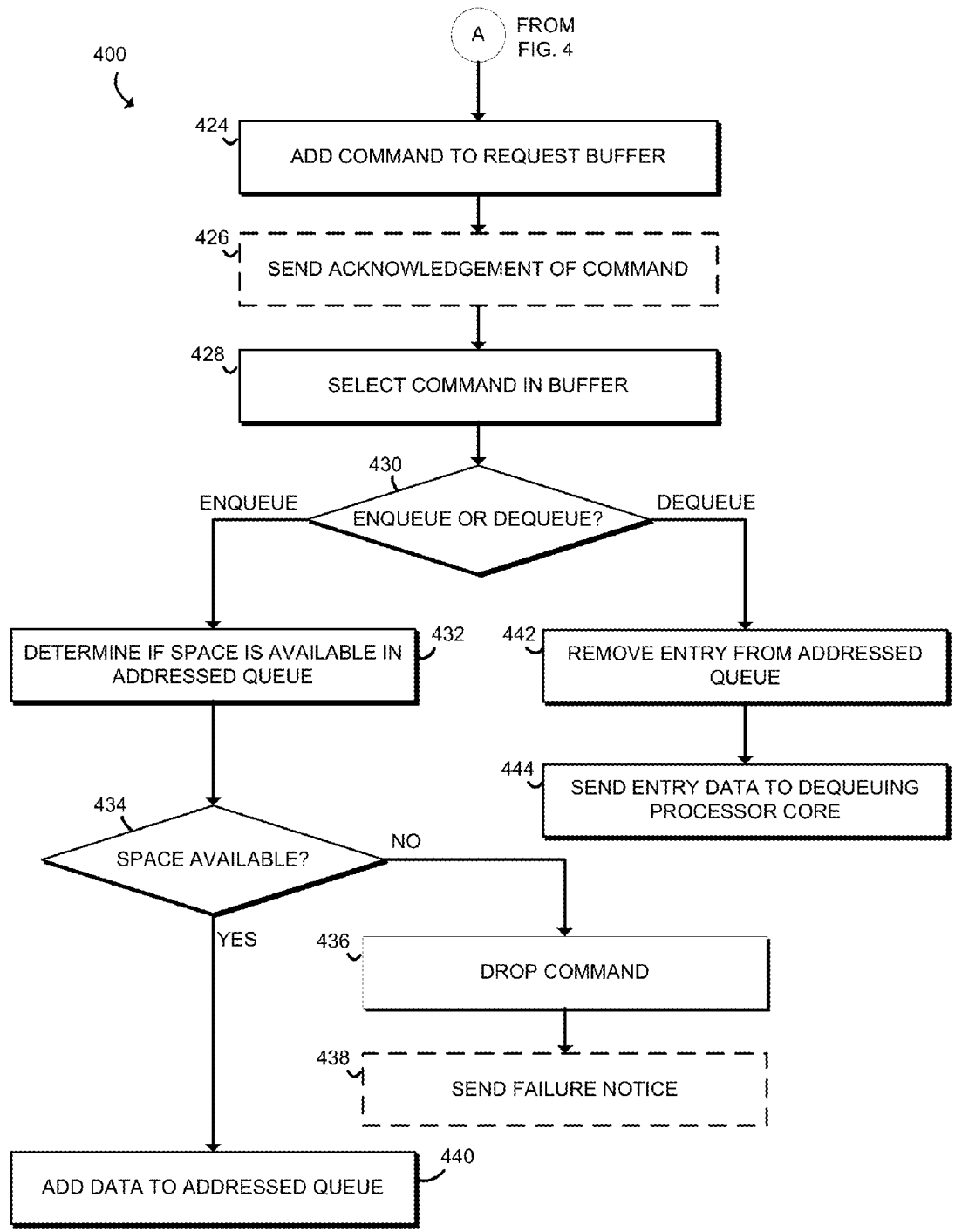

In block 424 of FIG. 5, the command is added to the request buffer 302. In block 426, in some embodiments, an acknowledgement that the command was received and added to the request buffer 302 may be sent to the processor core 202.

In block 428, the HQM 208 selects the command in the buffer to be processed. As described above, the scheduling circuitry 304 determines the order in which the commands in the request buffer 302 are processed. Of course, the HQM 208 may process additional commands or accept additional commands in the request buffer 302 between blocks 424 and 428.

In block 430, if the command is an enqueue command, the method 400 proceeds to block 432. Otherwise, the method 400 proceeds to block 442. In block 432, for an enqueue command, the HQM 208 determines if there is space available in the queue indicated by the queue address of the command In block 434, if there is not space available, the method 400 proceeds to block 436. Otherwise, the method 400 proceeds to block 440.

In block 436, the command is dropped since there is no space available to store the data. In block 438, in embodiments in which failure notices are sent, a failure notice is sent to the processor core 202 which sent the command In block 440, the data is added to the addressed queue.

In block 442, for a dequeue command, the HQM 208 removes the entry at the beginning of the queue (i.e., the entry that was first in the queue among all the entries in the queue) indicated by the queue address of the command In block 444, the HQM 208 sends the entry data to the processor core 202 that sent the command. If there is no queue data available in the addressed queue, the HQM 208 may, in some embodiments, send data so indicating, or may not send any data at all. In some embodiments, the HQM 208 may send an interrupt to the processor core 202 associated with the dequeue command if there is no queue data available in the addressed queue.

Figure 6:
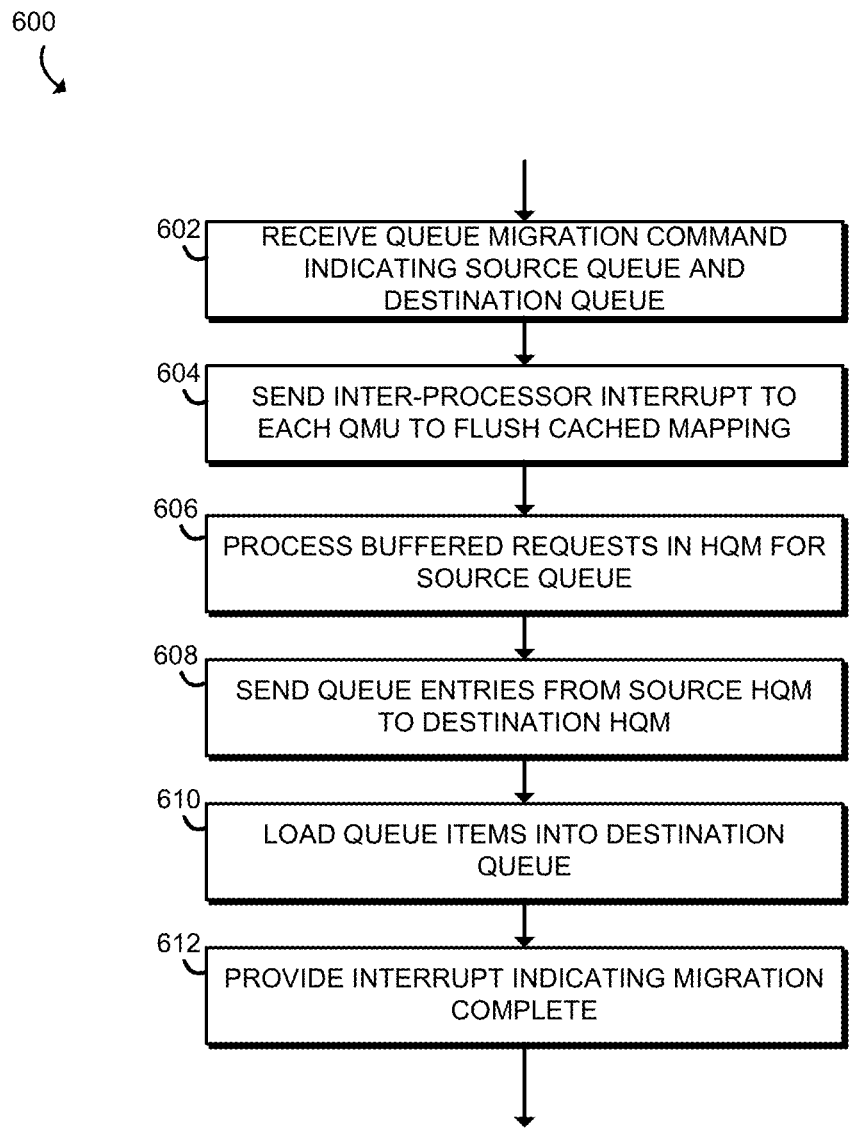
FIG. 6 is a simplified flow diagram of at least one embodiment of a method for migrating a queue from one hardware queue manager to a different hardware queue manager that may be executed by the processor of FIG. 2.

Referring now to FIG. 6, a method 600 for migrating a queue may be executed by a source HQM 208 and a destination HQM 208. In block 602, the source HQM 208 that currently holds the queue date receives a queue migration command, indicating the source queue in the source HQM 208 and the destination queue in the destination HQM 208. The source HQM 208 may receive the command in a variety of different ways, such as through MMIO or through execution of a migration command by one of the processor cores 202. The migration command may be its own command of the instruction set of the processor core 202, or it may be the same instruction as an enqueue or dequeue command with a special indication of a migration command, such as a special queue address.

In block 604, the source HQM 208 sends inter-process interrupts to each QMU 204 to flush any cached mapping associated with the queue to be migrated (the QMU 204 is discussed in more detail below in regard to FIG. 7). In some embodiments, the entries in the QMU 204 may be flushed through other means, without direct involvement of any HQM 208.

In block 606, the source HQM 208 processes all of the remaining commands in the request buffer 302. As described in more detail above, the order in which the commands in the request buffer 302 are executed is determined by the scheduling circuitry 304.

In block 608, the source HQM 208 sends the queue entries to the destination HQM 208. In block 610, the destination HQM 208 loads the queue entries into the queue memory 308 of the destination HQM 208. In block 612, the destination HQM 208 provides an interrupt to a processor core 202 (such as the processor core 202 which initiated the migration) indicating that the migration is complete. In some embodiments, the source HQM 208 may additionally or alternatively provide the interrupt to the processor core 202. In other embodiments, neither the source nor destination HQM 208 may provide an interrupt to the processor core 202.

Figure 7:
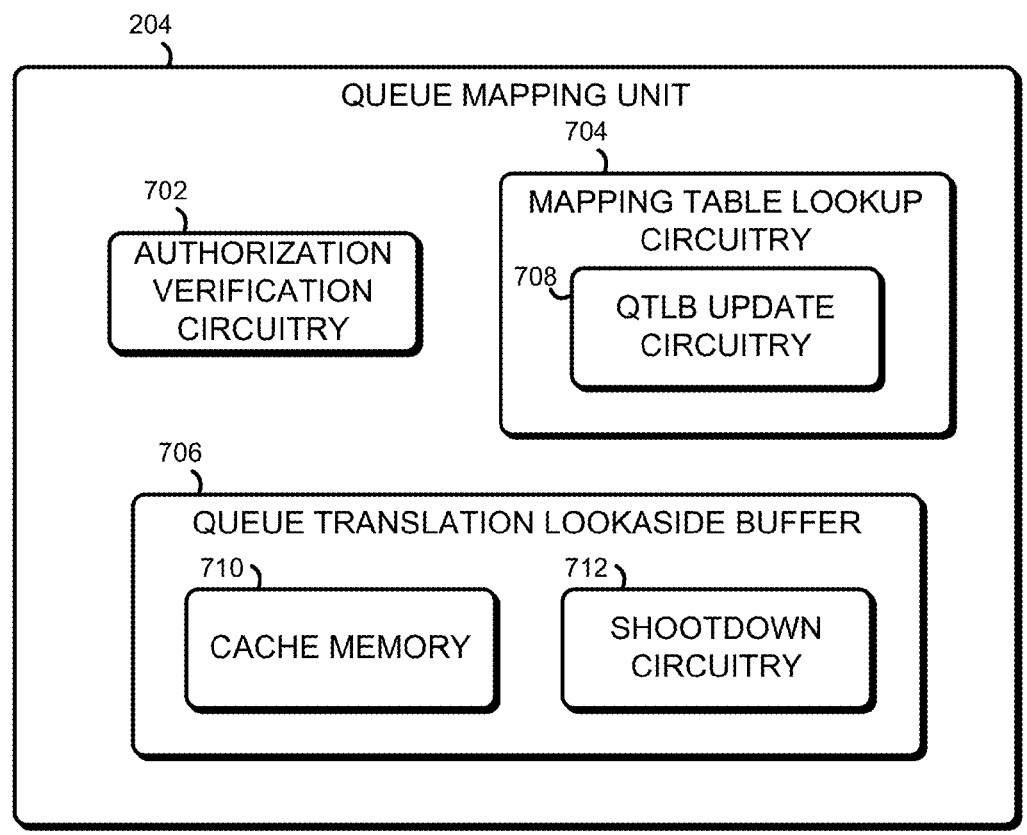
FIG. 7 is a simplified block diagram of at least one embodiment of a queue mapping unit of the processor of FIG. 2.

Referring now to FIG. 7, each illustrative queue mapping unit (QMU) 204 includes authorization verification circuitry 702, mapping table lookup circuitry 704, and a queue translation lookaside buffer (QTLB) 706. It should be appreciated that, in some instances, one or more of the components of the QMU 204 may include or otherwise incorporate some of the structure or perform some of the functionality of some of the other components. For example, the authorization verification circuitry 702 may include or otherwise form a portion of the QTLB 706.

In the illustrative embodiment, queue addresses operate in a similar manner as virtual memory addresses, and when a thread running on a processor core 202 specifies a queue address, the queue address indicates a virtual queue address, not a physical queue address. Each valid virtual queue address is associated with a physical queue address, and the queue mapping table 106 stored in the memory 104 contains a mapping for each valid virtual queue address to each corresponding physical queue address. When a processor core 202 receives an enqueue or dequeue command with a virtual queue address, the processor core 202 refers to its associated QMU 204 to translate the virtual queue address to a physical queue address.

The authorization verification circuitry 702 verifies that the virtual queue address is an address that the current thread of the processor core 202 has access to. In some embodiments, the authorization verification circuitry 702 may need to access the entry in the queue mapping table 106 in order to make the verification. Of course, the authorization verification circuitry 702 can access the entry in the QTLB 706 if it is present therein.

When the queue mapping unit 204 first maps a certain virtual queue address, the mapping table lookup circuitry 704 accesses the queue mapping table 106 in the memory 104. The physical queue address associated with the virtual queue address is retrieved, and provided to the processor core 202. The mapping table lookup circuitry 704 includes QTLB update circuitry 708, which updates the QTLB 706 with the mapping information.

The QTLB 706 is configured to store mapping information received from the mapping table lookup circuitry 704 in a cache memory 710 of the QTLB 706. Before accessing the queue mapping table 106, the queue mapping unit 204 can check if a virtual queue address to be mapped is present in the cache memory 710 of the QTLB 706. If it is, the mapping can be retrieved from the QTLB 706, and checking the queue mapping table 106 is not necessary.

When the mapping of a virtual queue address changes (for example, during a queue migration, as discussed above in regard to FIG. 6), a QTLB shootdown is sent to the QMU 204 by, e.g., an inter-process interrupt sent to the processor core 202 associated with the QMU 204. The QTLB shootdown is handled by shootdown circuitry 712 of the QTLB 706, which updates the entry of the cache memory 710 associated with the virtual address sent as part of the QTLB shootdown.

It should be appreciated that, in some embodiments, a processor core 202 may be able to operate directly on the physical queue addresses, without first being translated by the QMU 204 from virtual addresses. Such embodiments may always operate directly on the physical queue addresses and may not have an associated QMU 204, or such embodiments may only sometimes operate directly on the physical queue addresses, and may still have an associated QMU 204.

Figure 8:
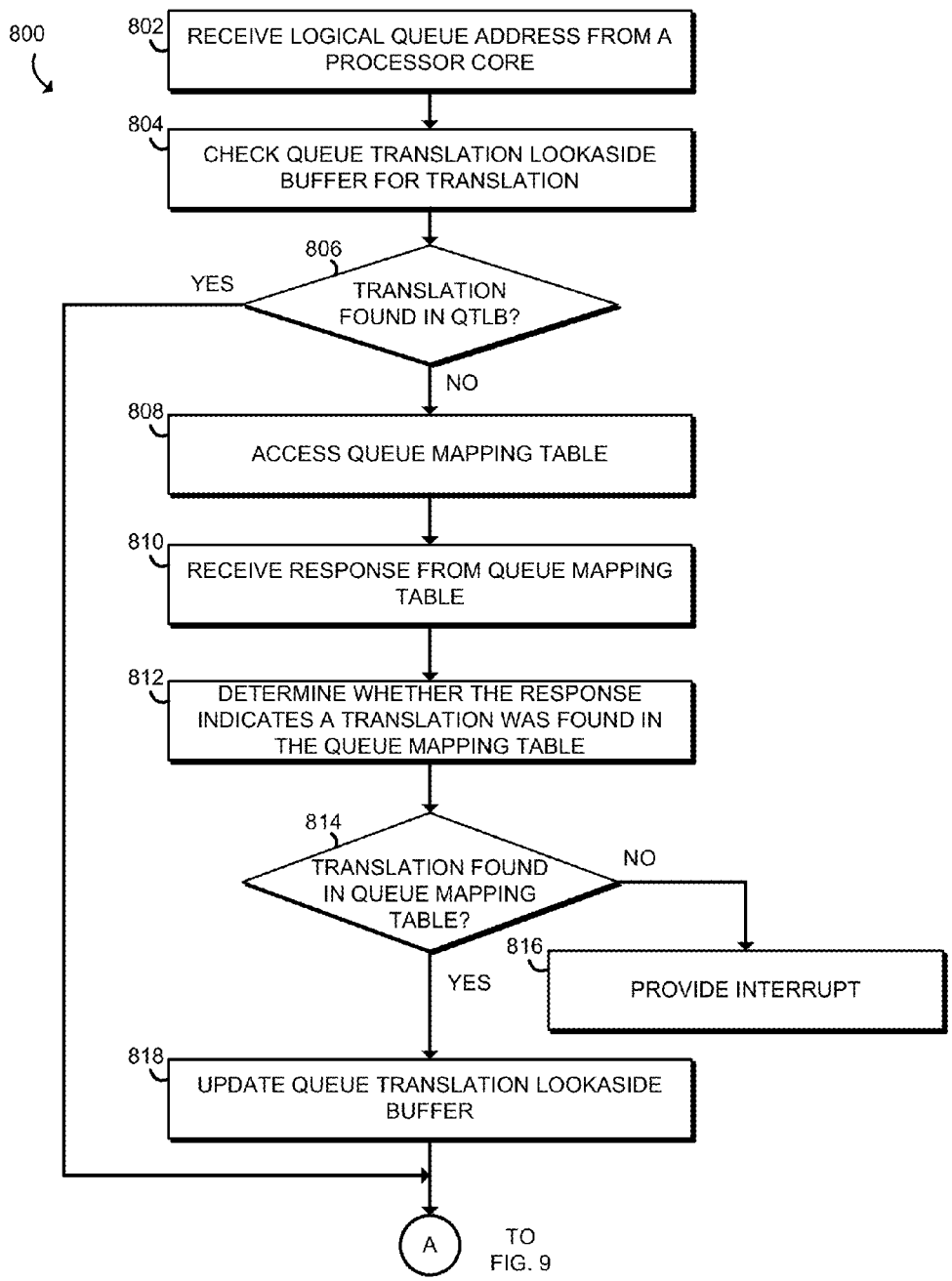
FIGS. 8 and 9 are a simplified flow diagram of at least one embodiment of a method for translating a virtual queue address into a physical queue address that may be executed by the queue mapping unit of FIG. 7.

Referring now to FIG. 8, in use, the QMU 204 may execute a method 800 for translating a virtual address to a physical address. In block 802, the QMU 204 receives a virtual queue address from a processor core 202.

In block 804, the QMU 204 checks the QTLB 706 for an entry indicating the translation from the virtual queue address to the associated physical queue address. In block 806, if the entry is found in the QTLB 706, the method 800 jumps forward to block 820 of FIG. 9. Otherwise, the method proceeds to block 808. In block 808, the QMU 204 accesses the queue mapping table 106 in the memory 104. In block 810, the QMU 204 receives a response from the queue mapping table 106, which either includes the translation or indicates that the translation was not available (e.g., because the virtual queue address was not valid). In block 812, the QMU 204 determines whether the response indicates that a translation was found in the queue mapping table. If the translation is found in the queue mapping table in block 814, the method 800 provides an interrupt to the processor core 202 corresponding to the QMU 204 in block 816. Otherwise, in block 818, the QMU 204 updates the QTLB 706 with the translated physical queue address.

Figure 9:
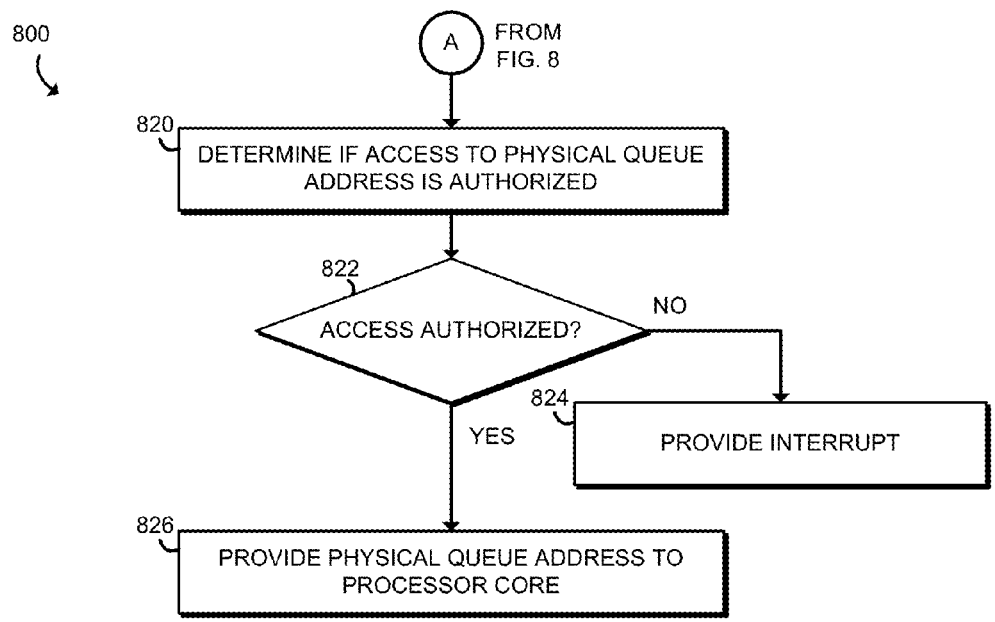

The method 800 then proceeds to block 820 of FIG. 9, in which the QMU 204 determines if access to the physical queue address is authorized. In some embodiments, the QMU 204 may additionally or alternatively check if access is authorized based on the virtual queue address, without necessarily translating the virtual queue address to a physical queue address first.

In block 822, if the access is not authorized, the method 800 proceeds to block 824, in which an interrupt is proved to the processor core 202 associated with the QMU 204. Otherwise, the QMU 204 provides the physical queue address to the processor core 202 associated with the QMU 204 in block 826. In some embodiments, the entire enqueue (or dequeue) command may be sent to the QMU 204, which translates the virtual queue address to a physical queue address and then sends the command to the addressed HQM 208, without ever returning the physical queue address to the associated processor core 202.

Figure 10:
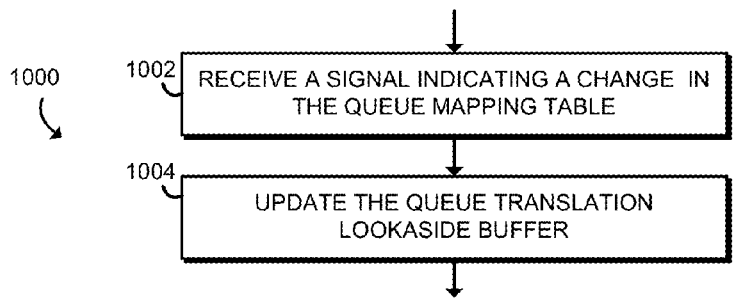
FIG. 10 is a simplified flow diagram of at least one embodiment of a method for updating the queue mapping unit that may be executed by the queue mapping unit of FIG. 7.

Referring now to FIG. 10, in use, the QMU 204 may execute a method 1000 for updating the queue translation lookaside buffer 706. The method 1000 begins in block 1002, in which the QMU 204 receives a signal indicating a change in the queue mapping table. In the illustrative embodiment, the signal indicates the virtual queue address associated with the change. In other embodiments, the signal may additionally indicate a new physical address for the virtual queue address. In block 1004, the QMU 204 updates the QTLB 706. In the illustrative embodiment, the QTLB 706 is updated by removing or flushing the entry associated with the virtual queue address. In other embodiments in which the signal indicates the new physical queue address for the virtual queue address, the QMU 204 updates the entry in the QTLB 706 with the new physical queue address.

Figure 11:
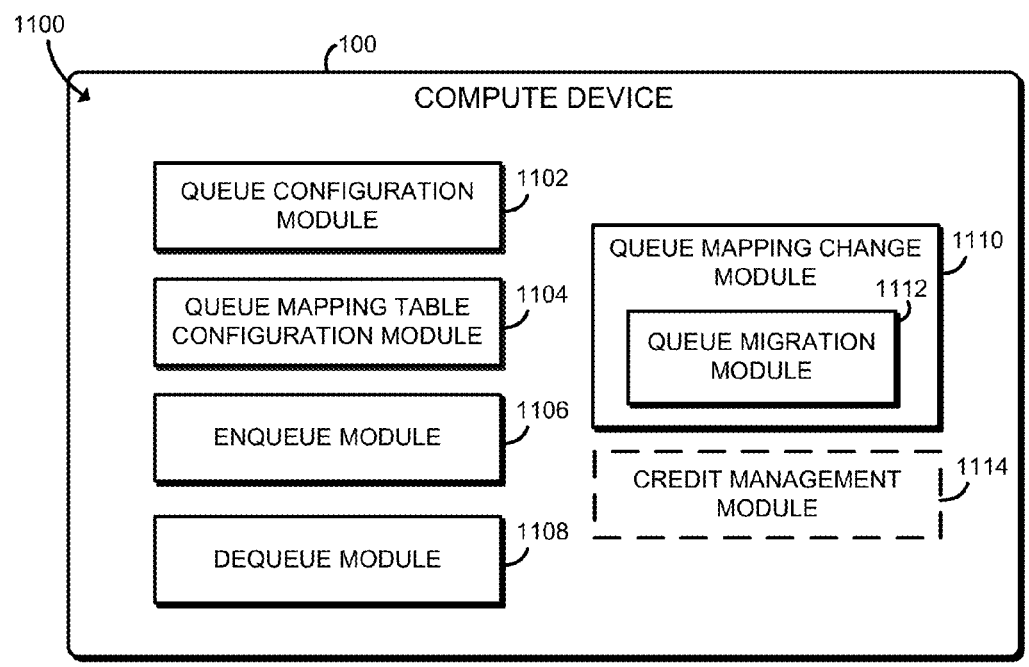
FIG. 11 is a simplified block diagram of at least one embodiment of an environment that may be established by the compute device of FIG. 1.

Referring now to FIG. 11, in use, the compute device 100 may establish an environment 1100. The illustrative environment 1100 includes a queue configuration module 1102, a queue mapping table configuration module 1104, an enqueue module 1106, a dequeue module 1108, and a queue mapping change module 1110. The various modules of the environment 1100 may be embodied as hardware, software, firmware, or a combination thereof. For example, the various modules, logic, and other components of the environment 1100 may form a portion of, or otherwise be established by, the processor 102 or other hardware components of the compute device 100, such as the memory 104. As such, in some embodiments, one or more of the modules of the environment 1100 may be embodied as circuitry or collection of electrical devices (e.g., a queue configuration circuit 1102, a queue mapping table configuration circuit 1104, an enqueue circuit 1106, etc.). It should be appreciated that, in such embodiments, one or more of the circuits (e.g., the queue configuration circuit 1102, the queue mapping table configuration circuit 1104, an enqueue circuit 1106, etc.) may form a portion of one or more of the processor 102, the memory 104, the I/O subsystem 108, and/or the data storage 110. Additionally, in some embodiments, one or more of the illustrative modules may form a portion of another module and/or one or more of the illustrative modules may be independent of one another.

The queue configuration module 1102 is configured to perform a configuration of one or more queues in each of the HQMs 208 of the processor 102 of the compute device 100. In the illustrative embodiment, the queue configuration module 1102 performs the configuration using MMIO. In other embodiments, the queue configuration module 1102 may perform the configuration using other means, such as specific instructions of the processor 102 or special parameters of the enqueue and/or dequeue instructions of the processor 102. In configuring one or more queues of an HQM 208, the queue configuration module 1102 specifies various parameters for the queue(s), such as size of each entry in the queue and the total size of the queue. In some embodiments, the queue configuration module 1102 specifies whether the total size of the queue is fixed or is dynamic (i.e., can be made bigger or smaller by the HQM 208 as necessary). The queue configuration module 1102 may also specify a scheduling policy of the HQM 208 which indicates the order in which items in the request buffer 302 are executed, such as in the order they are received, round robin, weighted round robin, preemptive priority, etc.

The queue mapping table configuration module 1104 is configured to perform a configuration of the queue mapping table 106 in the memory 104. As discussed above, the queue mapping table 106 indicates a mapping for each virtual queue address to a corresponding physical queue address. In some embodiments, there will be a single global mapping that is effective for each thread of the compute device 100. In other embodiments, some or all of the threads will have their own virtual queue address space, and the queue mapping table configuration module 1104 will establish a mapping for each valid virtual queue address for each virtual queue address space. In the illustrative embodiment, the queue mapping table 106 also includes information indicating what thread or processor core 202 is authorized to access which physical queue address.

When the queue configuration module 1102 changes the configuration of a queue, the queue mapping table configuration module 1104 may need to update the queue mapping table 106, and may need to initiate a QTLB shootdown in each QMU 204 of the processor 102 to flush or update the cache entries in the QMU 204 relating to the updated entries in the queue mapping table 106. In the illustrative embodiment, the QTLB shootdown may be initiated using MMIO. In other embodiments, the QTLB shootdown may be initiated using other means, such as specific instructions of the processor 102 or special parameters of the enqueue and/or dequeue instructions of the processor 102. In some embodiments, the processor 102 may automatically initiate the QTLB shootdown after determining an entry in the queue mapping table 106 has changed.

The enqueue module 1106 is configured to enqueue queue data to a desired queue data structure of a target HQM 208 of the processor 102 of the compute device 100 using an instruction of the processor 102. In some embodiments, the enqueue module 1106 is further configured to handle any errors, exceptions, or interrupts related to enqueuing, such as an indication that there is not enough room in the request buffer 302 or the target queue data structure.

The dequeue module 1108 is configured to dequeue queue data from a desired queue data structure of a target HQM 208 of the processor 102 of the compute device 100 using an instruction of the processor 102. In some embodiments, the dequeue module 1108 is further configured to handle any errors, exceptions, or interrupts related to dequeuing, such as an indication that there is not enough room in the request buffer 302 or that there is no data available in the desired queue data structure.

The queue mapping change module 1110 is configured to determine if and when a change in the queue mapping table 106 is desired. For example, the queue mapping change module 1110 may, in some embodiments, determine an optimal placement (i.e. the optimal HQM 208) for one or more virtual queues each time a thread is swapped in or out of a processor core 202. In the illustrative embodiment, the queue mapping change module 1110 is configured to determine the latency for a dequeue command from the processor core 202 in question to each HQM 208 of the processor 102, and the HQM 208 with the lowest latency is selected for placement of the virtual queue from which the processor core 202 will be dequeuing. In other embodiments, additional factors may be considered, such as the latency for enqueuing actions to the virtual queue, the latency for dequeuing actions from additional processor cores 202 which will be dequeuing, the overhead cost of migrating the virtual queue, and the effect relating to other virtual queues that may need to be moved in order to make space available in the desired HQM 208.

The queue migration module 1112 is configured to migrate a virtual queue from its current HQM 208 to the target HQM 208 when the queue mapping change module 1110 determines that the virtual queue should be moved. In the illustrative embodiment, the queue migration module 1112 initiates the migration using MMIO, and the processor 102 performs the migration without any further instruction from the queue migration module 1112. In other embodiments, the queue migration module 1112 may initiate the migration using other means, such as specific instructions of the processor 102 or special parameters of the enqueue and/or dequeue instructions of the processor 102. As discussed in more detail above in regard to FIG. 6, when the migration is complete, an interrupt is triggered to signal to the queue migration module 1112 that the migration is complete. In some embodiments, the queue migration module 1112 may perform some of the steps of the migration, such as removing all of the data in the current HQM 208 and adding it to the target HQM 208.

Optionally, the compute device 100 includes a credit management module 1114. The credit management module 1114 is configured to acquire credit from the credit management circuitry 312 of an HQM 208 before an enqueuing or dequeuing operation, and to manage any credit associated with any credit management circuitry 312.

Figure 12:
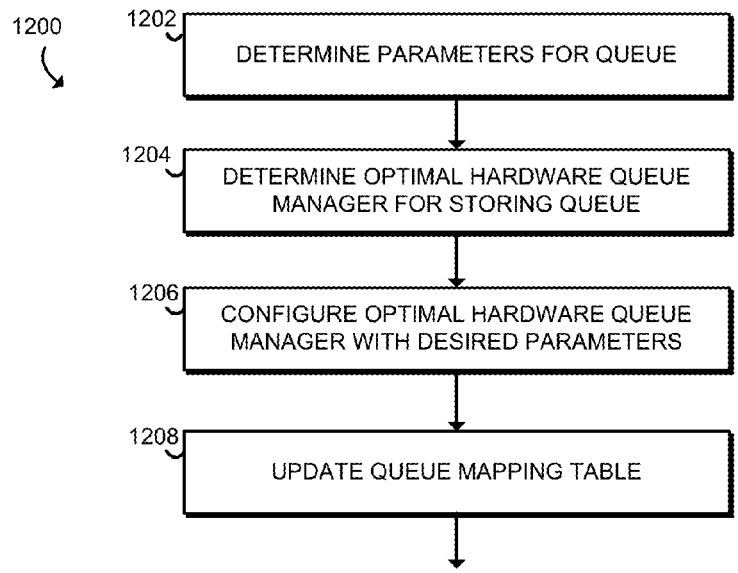
FIG. 12 is a simplified flow diagram of at least one embodiment of a method for configuring a queue that may be executed by the compute device of FIG. 1.

Referring now to FIG. 12, in use, the compute device 100 may execute a method 1200 for configuring a queue for an HQM 208 of the processor 102. The method 1200 begins in block 1202, in which the compute device 100 determines the parameters for the queue, including the size of an entry in the queue as well as the total size of the queue. The compute device 100 may also determine a scheduling policy for the HQM 208 associated with the queue. In embodiments with dynamic sizing of a queue, the compute device 100 may specify that the size is dynamic instead of determining a parameter indicating the total size of the queue.

In block 1204, the compute device 100 determines the optimal placement for the queue being configured. As discussed above, the compute device 100 may take into account the expected dequeue latency for the queue, as well as factors such as expected enqueue latency and overhead for any required migration of queues.

In block 1206, the compute device 100 configures the optimal HQM 208 using the parameters determined in block 1204. Of course, if a different queue is already present in the optimal HQM 208, that queue may need to be migrated before the HQM 208 is configured for the new queue. In block 1208, the compute device 100 updates the queue mapping table 106 with the new mapping information relating to the queue.

Figure 13:
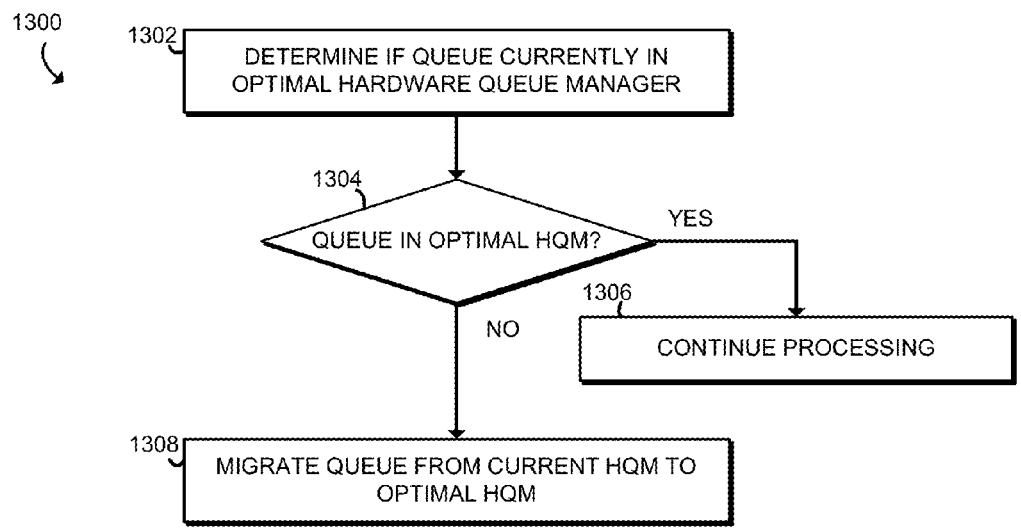
FIG. 13 is a simplified flow diagram of at least one embodiment of a method for migrating a queue that may be executed by the compute device of FIG. 1.

Referring now to FIG. 13, in use, the compute device 100 may execute a method 1300 for migrating a virtual queue. The method 1300 begins in block 1302, in which the compute device determines if the queue is currently in the optimal HQM 208. To do so, the compute device 100 may take into account the expected dequeue latency for the queue in each HQM 208, as well as factors such as expected enqueue latency and overhead for any required migration of queues. If multiple processor cores 202 are expected to be dequeuing from the virtual queue, the compute device 100 may determine the expected average latency for all of the processor cores 202 or may determine the expected average latency per dequeue operation by performing a weighted average of the latencies based on the frequency each processor core 202 is expected to perform a dequeue operation.

In block 1304, if the virtual queue is currently in the optimal HQM 208, the method continues processing in block 1306 without making any changes. Otherwise, the method 1300 proceeds to block 1308. In block 1308, the compute device 100 migrates the virtual queue from the current HQM 208 to the optimal HQM 208. As described above, the compute device 100 may initiate the migration using MMIO. The compute device 100 may also, as part of the migration, update the queue mapping table 106.

Figure 14:
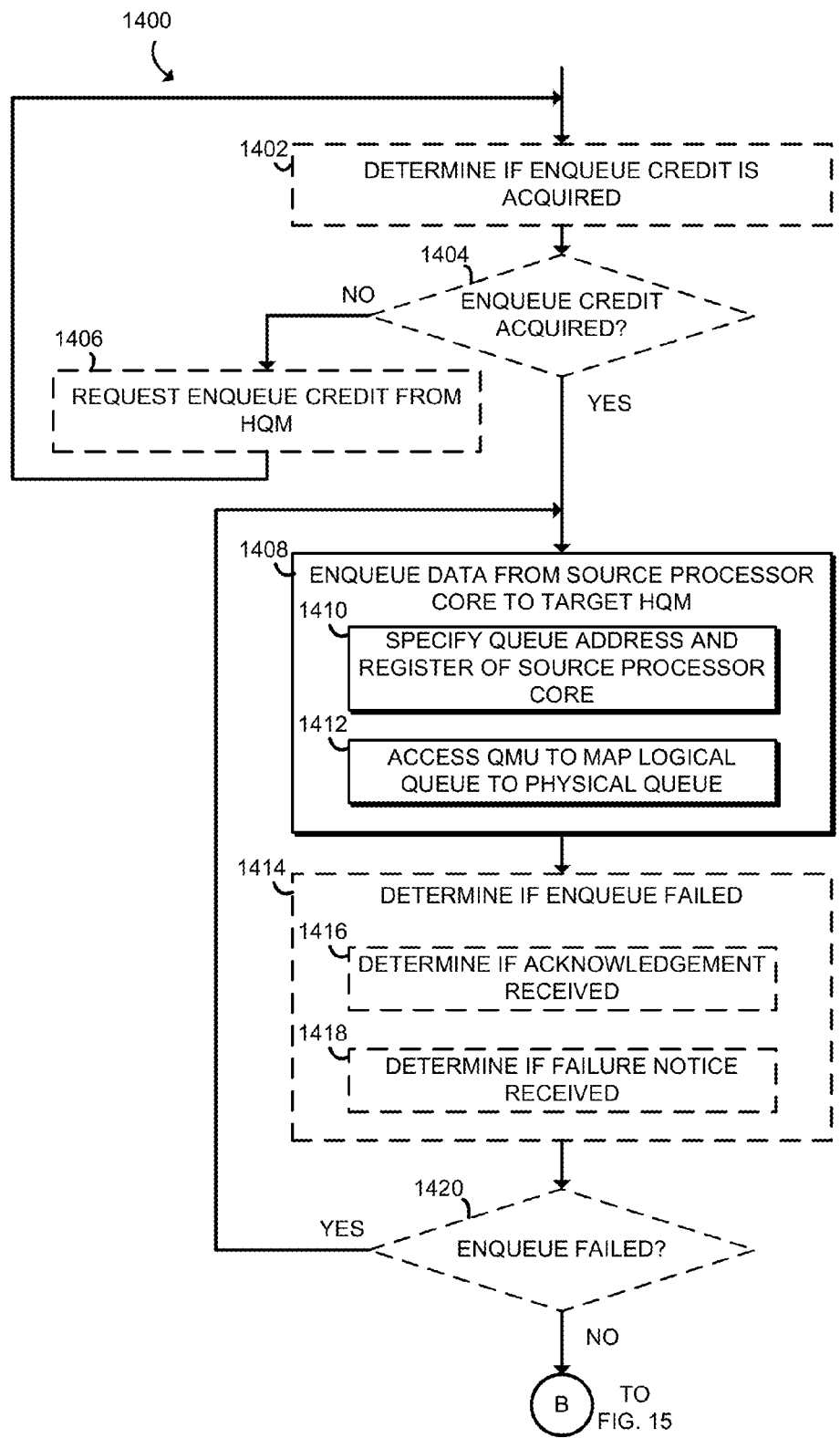
FIGS. 14 and 15 are a simplified flow diagram of at least one embodiment of a method for enqueuing data into a hardware queue manager of the processor of FIG. 2 and dequeuing data from the hardware queue manager that may be executed by the compute device of FIG. 1.

Referring now to FIG. 14, in use, the compute device 100 may execute a method 1400 for enqueuing and dequeuing queue data to and from a queue of an HQM 208 of the compute device 100. In embodiments in which the credit management circuitry 312 is enabled, the method 1400 may begin with block 1402 in which the compute device 100 determines if enqueue credit is acquired. In some embodiments, in block 1404, if enqueue credit is not acquired, the compute device 100 requests enqueue credit in block 1406 from the target HQM 208, and returns to block 1402 to again check whether enqueuer credit has been acquired.

If enqueuer credit has been acquired or if the credit management circuitry 312 is not enabled, the method 1400 advances to block 1408. In block 1408, the compute device 100 enqueues data from the source processor core 202 to the target HQM 208. As part of the enqueuing step, in the illustrative block 1410, the compute device 100 specifies a queue address and a register of the source processor core 202 containing the data to be enqueued. In other embodiments, the compute device 100 may specify the data directly in the enqueue command to be enqueued, instead of specifying a register. In the illustrative embodiment, the queue address is a virtual queue address, and is translated by the QMU 204 associated with the source processor core 202 to a physical queue address in block 1412. In some embodiments, the queue address may be a physical queue address, and no translation may be necessary.

In some embodiments, in block 1414, the compute device 100 determines if the enqueue command failed. As part of this determination, the compute device 100 may determine in block 1416 if an acknowledgement was received and/or may determine in block 1418 if a failure notice was received. In embodiments in which acknowledgements are sent but failure notices are not, lack of receipt of the acknowledgement may indicate that the enqueue command failed. In embodiments in which failure notices are sent but acknowledgements are not, lack of receipt of the failure notice may indicate that the enqueue command succeeded.

Figure 15:
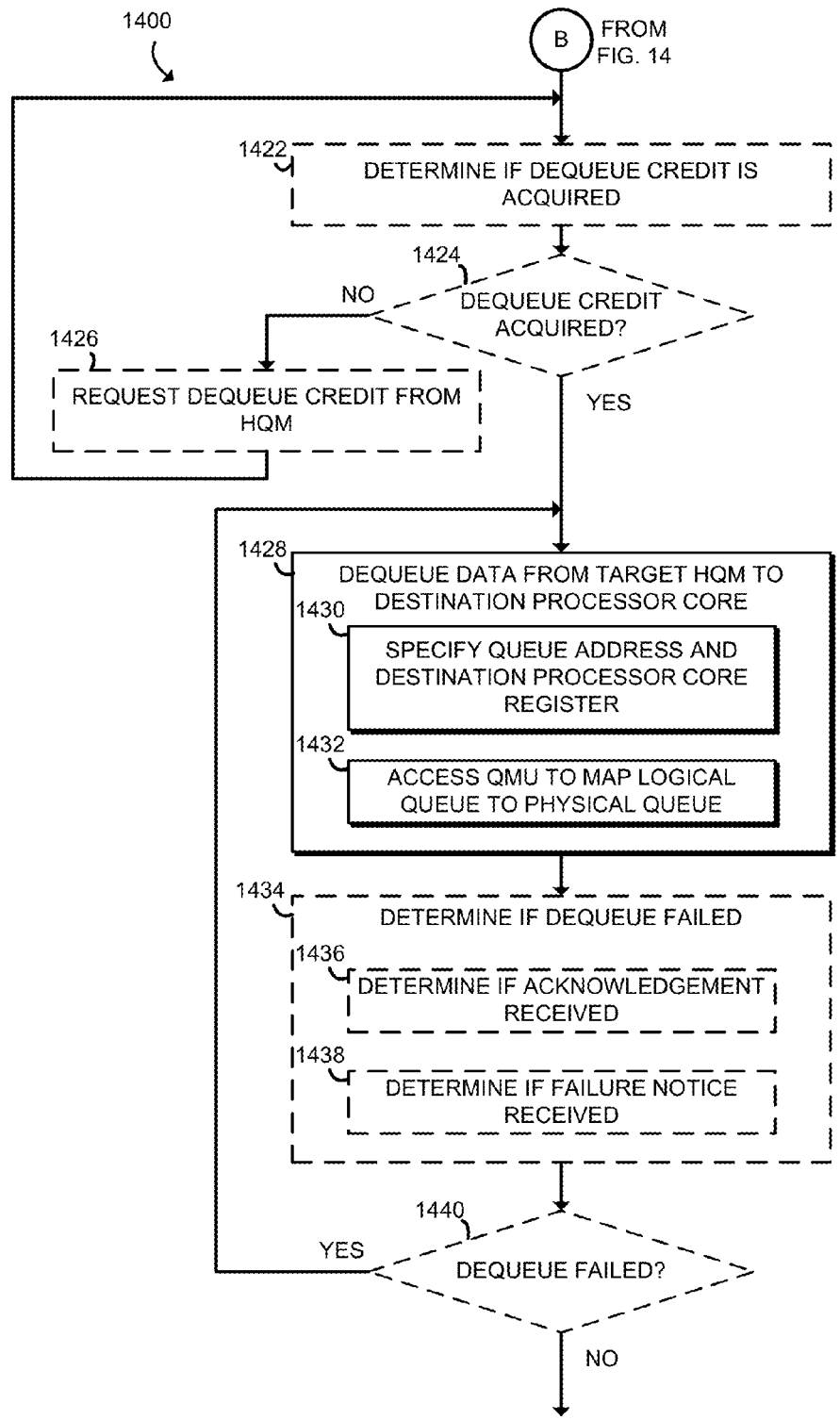

In block 1420, if the enqueue failed, the method 1400 loops back to block 1408 in which the compute device 100 again attempts to enqueue data from the source processor core 202 to the target HQM 208. Otherwise, the method 1400 proceeds to block 1422 of FIG. 15. In block 1422, in embodiments in which the credit management circuitry 312 is enabled, the compute device 100 determines whether dequeue credit is acquired. If the compute device 100 determines that dequeue credit is not acquired in block 1424, the compute device 100 requests dequeue credit in block 1426 from the target HQM 208, and the method 1400 loops back to block 1422 in which the compute device 100 again determines whether dequeuer credit has been acquired.

Referring back to block 1424, if dequeue credit has been acquired or if the credit management circuitry 312 is not enabled, the method 1400 advances to block 1428. In block 1428, the compute device 100 dequeues data from the target HQM 208 to the destination processor core. As part of the dequeuing process, the compute device 100 in block 1430 specifies the queue address and a register of the destination processor core 202 for the dequeued data to be stored. In the illustrative embodiment, the queue address is a virtual queue address, and is translated by the QMU 204 associated with the destination processor core 202 to a physical queue address in block 1432. In some embodiments, the queue address may be a physical queue address, and no translation may be necessary.

In the illustrative embodiment, the dequeued data is returned to the destination processor core and stored in the destination register in block 1428. In some embodiments, in block 1434, the compute device 100 may determine whether the dequeue command has failed. As part of this determination, the compute device may determine in block 1436 if an acknowledgement was received and/or may determine in block 1438 if a failure notice was received. In embodiments in which acknowledgements are sent but failure notices are not, lack of receipt of the acknowledgement may indicate that the enqueue command failed. In embodiments in which failure notices are sent but acknowledgements are not, lack of receipt of the failure notice may indicate that the enqueue command succeeded.

In block 1440, if the dequeue failed, the method 1400 loops back to block 1428 in which the compute device 100 again attempts to dequeue data from the target HQM 208 to the destination processor core. Otherwise, the dequeue command is complete, and the method 1400 is complete and the compute device 100 may continue running.

Figure 16:
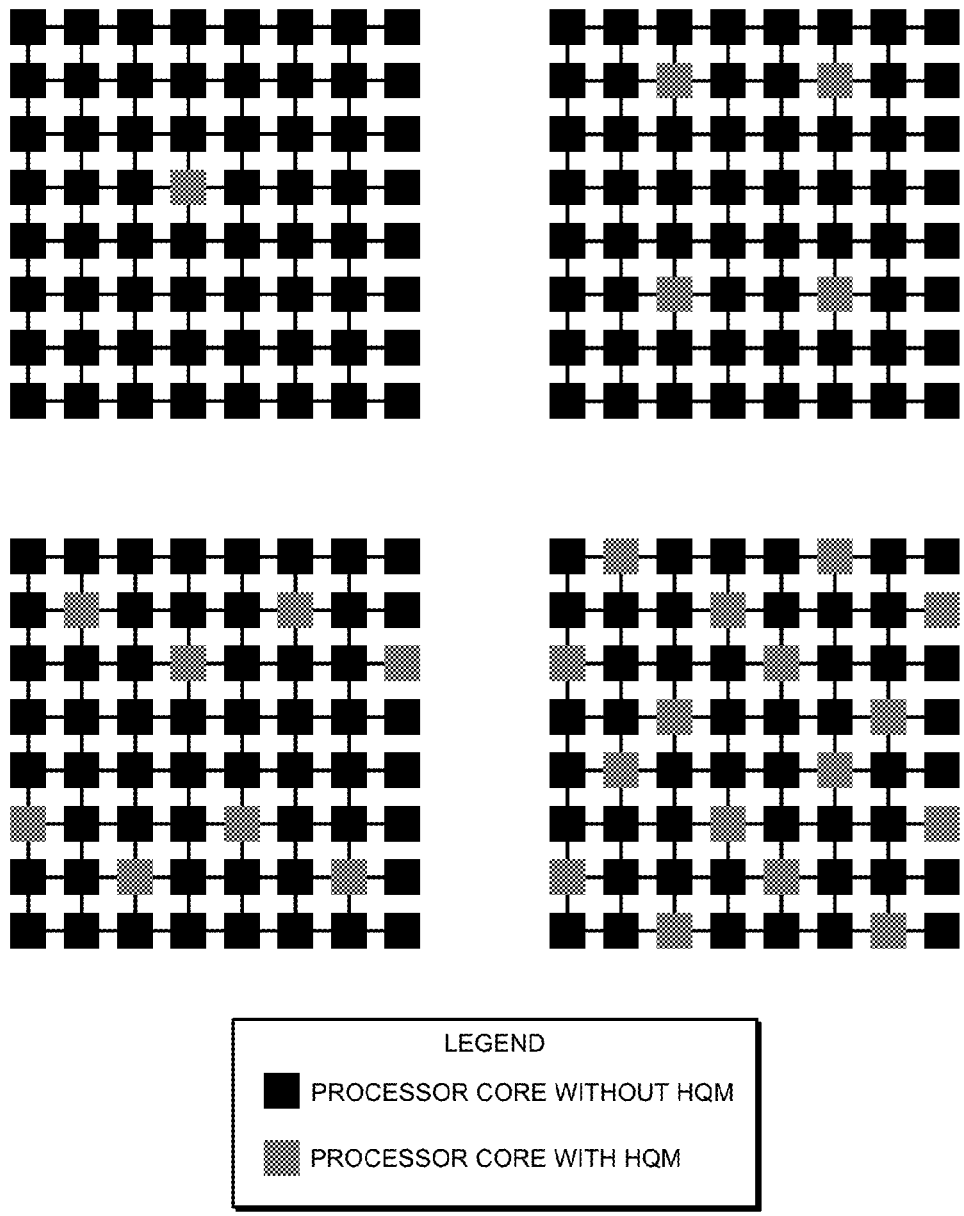
FIG. 16 is a simplified block diagram of several possible embodiments of a distribution of several hardware queue managers among several processor cores of the processor of FIG. 2.

Referring now to FIG. 16, a simplified illustration shows several possible embodiments with different distributions of HQMs 208 among processor cores 202. Each black block indicates a processor core 202, and each gray block indicates a processor core 202 and a nearby HQM 208. Each processor core 202 is connected to each HQM 208 using the interconnect circuitry 206, which is depicted by the lines connecting the blocks. Each embodiment in FIG. 16 has 64 processor cores, with one (top left), four (top right), eight (bottom left), or sixteen (bottom right) HQMs 208. For each embodiment of FIG. 16, an optimal placement for the HQMs 208 was determined. The optimal placement minimizes the average dequeue latency for each processor core 202 assuming each processor core 202 accesses the nearest HQM 208.

EXAMPLES

Illustrative examples of the devices, systems, and methods disclosed herein are provided below. An embodiment of the devices, systems, and methods may include any one or more, and any combination of, the examples described below.

Example 1 includes a processor comprising a plurality of processor cores; a plurality of hardware queue managers; and interconnect circuitry to connect each hardware queue manager of the plurality of hardware queue managers to each processor core of the plurality of processor cores, wherein each hardware queue manager of the plurality of hardware queue managers comprises enqueue circuitry to store data received from a processor core of the plurality of processor cores in a data queue associated with the respective hardware queue manager in response to an enqueue command generated by the processor core, wherein the enqueue command identifies the respective hardware queue manager, and dequeue circuitry to retrieve the data from the data queue associated with the respective hardware queue manager in response to a dequeue command generated by a processor core of the plurality of processor cores, wherein the dequeue command identifies the respective hardware queue manager.

Example 2 includes the subject matter of Example 1, and wherein the enqueue command comprises a physical queue address of the respective hardware queue manager, wherein to store the data comprises to add the data to a queue data structure in queue storage circuitry of the respective hardware queue manager based on the physical queue address, wherein the dequeue command further comprises the physical queue address, and wherein to retrieve the data from the data queue comprises to remove the data from the queue data structure of the queue storage circuitry based on the physical queue address.

Example 3 includes the subject matter of any of Examples 1 and 2, and wherein the queue data structure of the queue storage circuitry is to hold at least two entries associated with the physical queue address.

Example 4 includes the subject matter of any of Examples 1-3, and wherein the queue storage circuitry further comprises a second queue data structure, wherein the second queue data structure is to hold at least two entries associated with a second physical queue address.

Example 5 includes the subject matter of any of Examples 1-4, and wherein entries associated with the queue data structures are a different size than entries associated with the second queue data structure.

Example 6 includes the subject matter of any of Examples 1-5, and wherein the queue data structure is a different total size than the second queue data structure.

Example 7 includes the subject matter of any of Examples 1-6, and wherein the total size of the queue data structure is dynamic.

Example 8 includes the subject matter of any of Examples 1-7, and wherein each hardware queue manager of the plurality of hardware queue managers further comprises a request buffer, wherein the request buffer is to store the data and the physical queue address in response to the enqueue command generated by the processor core before the data is stored by the enqueue circuitry store the physical queue address in response to the dequeue command generated by the processor core before the data is retrieved by the dequeue circuitry.

Example 9 includes the subject matter of any of Examples 1-8, and wherein the request buffer is to process commands in the order in which they were received.

Example 10 includes the subject matter of any of Examples 1-9, and wherein the request buffer is to process commands based on a scheduling policy of scheduling circuitry of the respective hardware queue manager.

Example 11 includes the subject matter of any of Examples 1-10, and, wherein the scheduling policy is to indicate that the request buffer is to process commands based on a round robin.

Example 12 includes the subject matter of any of Examples 1-11, and wherein the scheduling policy is to indicate that the request buffer is to process commands based on a weighted round robin.

Example 13 includes the subject matter of any of Examples 1-12, and wherein the scheduling policy is to indicate that the request buffer is to process commands based on preemptive priority.

Example 14 includes the subject matter of any of Examples 1-13, and wherein the enqueue circuitry of each of the plurality of hardware queue managers is further to determine, in response to the enqueue command, whether space is available in the request buffer; and drop the enqueue command in response to a determination that there is not space available in the request buffer.

Example 15 includes the subject matter of any of Examples 1-14, and wherein the enqueue circuitry of each of the plurality of hardware queue managers is further to send a failure notice to the processor core associated with the enqueue command in response to the determination that there is not space available in the request buffer.

Example 16 includes the subject matter of any of Examples 1-15, and wherein the enqueue circuitry of each of the plurality of hardware queue managers is further to send an acknowledgement to the processor core associated with the enqueue command in response to a determination that there is space available in the request buffer.

Example 17 includes the subject matter of any of Examples 1-16, and wherein the enqueue circuitry of each of the plurality of hardware queue managers is further to determine, in response to the enqueue command, whether there is space available in the data queue; and drop the enqueue command in response to a determination that there is not space available in the data queue.

Example 18 includes the subject matter of any of Examples 1-17, and wherein the enqueue circuitry of each of the plurality of hardware queue managers is to send a failure notice to the processor core associated with the dequeue command in response to the determination that there is not space available.

Example 19 includes the subject matter of any of Examples 1-18, and wherein the dequeue circuitry of each of the plurality of hardware queue managers is further to determine, in response to the dequeue command, whether there is data available in the data queue; drop the dequeue command in response to a determination that there is not data available in the data queue.

Example 20 includes the subject matter of any of Examples 1-19, and wherein the dequeue circuitry of each of the plurality of hardware queue managers is further to send a failure notice to the processor core associated with the dequeue command in response to the determination that there is not data available in the data queue.

Example 21 includes the subject matter of any of Examples 1-20, and, wherein the enqueue circuitry is to store data only in response to the enqueue command generated by a first subset of the plurality of processor cores, and wherein the dequeue circuitry is to retrieve the data only in response to the dequeue command generated by a second subset of the plurality of processor cores, wherein each subset comprises at least one processor core of the plurality of processor cores.

Example 22 includes the subject matter of any of Examples 1-21, and wherein the first subset and the second subset are non-overlapping.

Example 23 includes the subject matter of any of Examples 1-22, and wherein the plurality of hardware queue managers are essentially evenly distributed throughout the processor.

Example 24 includes the subject matter of any of Examples 1-23, and further including a plurality of queue mapping units, wherein each of the plurality of processor cores is associated with a different queue mapping unit of the plurality of queue mapping units and each of the plurality of queue mapping units is associated with a different processor core of the plurality of processor cores, wherein each queue mapping unit of the plurality of queue mapping units is to receive a virtual queue address from the corresponding processor core; translate the virtual queue address to a physical queue address; and provide the physical queue address to the corresponding processor core.

Example 25 includes the subject matter of any of Examples 1-24, and wherein each queue mapping unit of the plurality of queue mapping units comprises a queue translation lookaside buffer, wherein to translate the virtual queue address to the physical queue address comprises to determine whether a physical queue address corresponding to the virtual queue address is in the corresponding queue translation lookaside buffer; access, in response to a determination that the physical queue address is not in the corresponding queue translation lookaside buffer, a queue mapping table in a memory associated with the processor for the physical queue address; receive a response from the queue mapping table; determine whether the response indicates the physical queue address; update, in response to a determination that the response indicates the physical queue address, the queue translation lookaside buffer; and provide, in response to a determination that the response does not indicate the physical queue address, an interrupt to the corresponding processor core.

Example 26 includes the subject matter of any of Examples 1-25, and wherein to translate the virtual queue address to the physical queue address further comprises to determine whether a thread associated with the corresponding processor core is authorized to access the physical queue address; and provide, in response to a determination that the thread is not authorized to access the physical queue address, an interrupt to the corresponding processor core.

Example 27 includes the subject matter of any of Examples 1-26, and wherein each queue mapping unit of the plurality of queue mapping units further comprises shootdown circuitry, wherein the shootdown circuitry is to receive a signal indicating a change in an entry in the queue mapping table associated with the virtual queue address; and update, in response to the signal, the queue translation lookaside buffer.

Example 28 includes the subject matter of any of Examples 1-27, and wherein each hardware queue manager of the plurality of hardware queue managers further comprises queue migration circuitry to receive a signal indicating a queue migration, the signal comprising a source physical queue address of the hardware queue manager and a destination physical queue address of a destination hardware queue manager of the plurality of hardware queue managers; and forward, in response to the signal, entries of a queue data structure associated with the source physical queue address to the destination hardware queue manager.

Example 29 includes the subject matter of any of Examples 1-28, and wherein each hardware queue manager of the plurality of hardware queue managers further comprises queue migration circuitry to receive a signal indicating a queue migration, the signal comprising a destination physical queue address of the hardware queue manager; receive, in response to the signal, entries of a queue data structure for the destination physical queue address; and provide, in response to receipt of the entries, an interrupt to a processor core of the plurality of processor cores.

Example 30 includes the subject matter of any of Examples 1-29, and wherein the enqueue circuitry of each of the plurality of hardware queue managers is further to store additional data received from a hardware component different from the processor in the data queue in response to an additional enqueue command generated by the hardware component, wherein the additional enqueue command identifies the respective hardware queue manger; and the dequeue circuitry of each of the plurality of hardware queue managers is further to retrieve the additional from the data queue in response to an additional dequeue command generated by the hardware component, wherein the additional dequeue command identifies the respective hardware queue manager.

Example 31 includes the subject matter of any of Examples 1-30, and wherein the plurality of processor cores comprises at least 8 processor cores.

Example 32 includes the subject matter of any of Examples 1-31, and wherein the plurality of processor cores comprises at least 32 processor cores.

Example 33 includes a method for using a distributed hardware queue manager, the method comprising enqueuing queue data from a source processor core of a plurality of processor cores of a processor of the compute device to a target hardware queue manager of a plurality of hardware queue managers of the processor; and dequeuing the queue data from the target hardware queue manager to a destination processor core of the plurality of processor cores.

Example 34 includes the subject matter of Example 33, and wherein the source processor core is different from the destination processor core.

Example 35 includes the subject matter of any of Examples 33 and 34, and wherein enqueuing queue data from the source processor core to the target hardware queue manager comprises enqueuing queue data to a queue data structure associated with a queue address of the target hardware queue manager.

Example 36 includes the subject matter of any of Examples 33-35, and wherein the queue address is a physical queue address.

Example 37 includes the subject matter of any of Examples 33-36, and wherein the queue address is a virtual queue address.

Example 38 includes the subject matter of any of Examples 33-37, and further including enqueuing additional queue data from the source processor core to the queue data structure of the target hardware queue manager; and dequeuing the additional queue data from the target hardware queue manager to the destination processor core, wherein the queue data and the additional queue data are stored in the target hardware queue manager simultaneously.

Example 39 includes the subject matter of any of Examples 33-38, and further including enqueuing additional queue data from the source processor core to an additional queue data structure associated with an additional queue address of the target hardware queue manager; and dequeuing the additional data from the target hardware queue manager to the destination processor core.

Example 40 includes the subject matter of any of Examples 33-39, and wherein a size of an entry in the queue data structure is different from a size of an entry in the additional queue data structure.

Example 41 includes the subject matter of any of Examples 33-40, and further including determining parameters for the target hardware queue manger, wherein the parameters indicate a size of an entry for each of a plurality of queue data structures of the target hardware queue manager; and configuring the target hardware queue manager based on the parameters.

Example 42 includes the subject matter of any of Examples 33-41, and wherein the parameters further indicate a total size for each of the plurality of queue data structures.

Example 43 includes the subject matter of any of Examples 33-42, and wherein the parameters further indicate that a total size for each of the plurality of queue data structures is dynamic.

Example 44 includes the subject matter of any of Examples 33-43, and wherein configuring the target hardware queue manager comprises configuring the target hardware queue manager with MMIO.

Example 45 includes the subject matter of any of Examples 33-44, and wherein the parameters indicate a first total size for a first queue data structure of the plurality of data structures and a second total size for a second queue data structure of the plurality of data structures, wherein the first total size is different from the second total size.

Example 46 includes the subject matter of any of Examples 33-45, and wherein the parameters indicate a first size for entries in a first queue data structure of the plurality of data structures and a second size for entries in a second queue data structure of the plurality of data structures, wherein the first size is different from the second size.

Example 47 includes the subject matter of any of Examples 33-46, and wherein the parameters indicate a scheduling policy of the target hardware queue manager, wherein the scheduling policy of the target hardware queue manager indicates the order of execution for commands received by the target hardware queue manager.

Example 48 includes the subject matter of any of Examples 33-47, and wherein the scheduling policy indicates that the order of execution for commands received by the target hardware queue manager is the order in which the commands were received.

Example 49 includes the subject matter of any of Examples 33-48, and wherein the scheduling policy indicates that the order of execution for commands received by the target hardware queue manager is based on a round robin.

Example 50 includes the subject matter of any of Examples 33-49, and wherein the scheduling policy indicates that the order of execution for commands received by the target hardware queue manager is based on a weighted round robin.

Example 51 includes the subject matter of any of Examples 33-50, and wherein the scheduling policy indicates that the order of execution for commands received by the target hardware queue manager based on preemptive priority.

Example 52 includes the subject matter of any of Examples 33-51, and further including determining, for each of the hardware queue managers, data indicative of a latency of a dequeue command from the destination processor core to the respective hardware queue manager; and determining, based on the data, a desired target hardware queue manager.

Example 53 includes the subject matter of any of Examples 33-52, and further including determining whether the desired target hardware queue manager is the target hardware queue manager; and migrating, in response to a determination that the desired target hardware queue manager is not the target hardware queue manger, data associated with a queue data structure of the target hardware queue manager from the target hardware queue manager to the desired target hardware queue manager.

Example 54 includes the subject matter of any of Examples 33-53, and wherein migrating data comprises updating a queue mapping table in a memory of the compute device.

Example 55 includes the subject matter of any of Examples 33-54, and further including determining, for each of the plurality of hardware queue managers, data indicative of an average latency of a dequeue command from each of the consuming processor cores, wherein determining the desired target hardware queue manager comprises determining, based on the data indicative of the average latency, a desired target hardware queue manager.

Example 56 includes the subject matter of any of Examples 33-55, and further including determining, for each of the consuming processor cores, data indicative of a frequency the plurality of instructions cause the respective consuming core to generate a dequeue command; determining, for each of the plurality of hardware queue managers and based on the data indicative of the frequency for each of the consuming cores to generate a dequeue command, data indicative of a weighted average latency of a dequeue command from each of the consuming processor cores, wherein determining the desired target hardware queue manager comprises determining, based on the data indicative of the weighted average latency, a desired target hardware queue manager.

Example 57 includes the subject matter of any of Examples 33-56, and further including determining at least two consuming processor cores of the plurality of processing cores, wherein the plurality of instructions cause each of the at least two consuming processor cores to dequeue from the same virtual queue address; determining, for each of the at least two consuming processor cores and for each of the plurality of hardware queue managers, data indicative of a latency of a dequeue command from the respective consuming processor core to the respective hardware queue manager; and determining, based on the data indicative of the latency, a desired target hardware queue manager.

Example 58 includes the subject matter of any of Examples 33-57, and further including determining, for each of a plurality of virtual queue addresses, a physical queue address associated with a hardware queue manager of the compute device; and configuring a queue mapping table in a memory of the compute device, wherein the queue mapping table indicates the corresponding physical queue address for each of the plurality of virtual queue addresses.

Example 59 includes the subject matter of any of Examples 33-58, and wherein the queue mapping table comprises authorization data associated with each of the plurality of virtual queue addresses.

Example 60 includes one or more computer-readable storage media comprising a plurality of instructions stored thereon that, when executed, cause a compute device to perform the method of any of Examples 33-59.

Example 61 includes a compute device comprising means for enqueuing queue data from a source processor core of a plurality of processor cores of a processor of the compute device to a target hardware queue manager of a plurality of hardware queue managers of the processor; and means for dequeuing the queue data from the target hardware queue manager to a destination processor core of the plurality of processor cores.

Example 62 includes the subject matter of Example 61, and wherein the source processor core is different from the destination processor core.

Example 63 includes the subject matter of any of Examples 61 and 62, and wherein the means for enqueuing queue data from the source processor core to the target hardware queue manager comprises means for enqueuing queue data to a queue data structure associated with a queue address of the target hardware queue manager.

Example 64 includes the subject matter of any of Examples 61-63, and wherein the queue address is a physical queue address.

Example 65 includes the subject matter of any of Examples 61-64, and wherein the queue address is a virtual queue address.

Example 66 includes the subject matter of any of Examples 61-65, and further including means for enqueuing additional queue data from the source processor core to the queue data structure of the target hardware queue manager; and means for dequeuing the additional queue data from the target hardware queue manager to the destination processor core, wherein the queue data and the additional queue data are stored in the target hardware queue manager simultaneously.

Example 67 includes the subject matter of any of Examples 61-66, and further including means for enqueuing additional queue data from the source processor core to an additional queue data structure associated with an additional queue address of the target hardware queue manager; and means for dequeuing the additional data from the target hardware queue manager to the destination processor core.

Example 68 includes the subject matter of any of Examples 61-67, and wherein a size of an entry in the queue data structure is different from a size of an entry in the additional queue data structure.

Example 69 includes the subject matter of any of Examples 61-68, and further including means for determining parameters for the target hardware queue manger, wherein the parameters indicate a size of an entry for each of a plurality of queue data structures of the target hardware queue manager; and means for configuring the target hardware queue manager based on the parameters.

Example 70 includes the subject matter of any of Examples 61-69, and wherein the parameters further indicate a total size for each of the plurality of queue data structures.

Example 71 includes the subject matter of any of Examples 61-70, and wherein the parameters further indicate that a total size for each of the plurality of queue data structures is dynamic.

Example 72 includes the subject matter of any of Examples 61-71, and wherein the means for configuring the target hardware queue manager comprises means for configuring the target hardware queue manager with MMIO.

Example 73 includes the subject matter of any of Examples 61-72, and wherein the parameters indicate a first total size for a first queue data structure of the plurality of data structures and a second total size for a second queue data structure of the plurality of data structures, wherein the first total size is different from the second total size.

Example 74 includes the subject matter of any of Examples 61-73, and wherein the parameters indicate a first size for entries in a first queue data structure of the plurality of data structures and a second size for entries in a second queue data structure of the plurality of data structures, wherein the first size is different from the second size.

Example 75 includes the subject matter of any of Examples 61-74, and wherein the parameters indicate a scheduling policy of the target hardware queue manager, wherein the scheduling policy of the target hardware queue manager indicates the order of execution for commands received by the target hardware queue manager.

Example 76 includes the subject matter of any of Examples 61-75, and wherein the scheduling policy indicates that the order of execution for commands received by the target hardware queue manager is the order in which the commands were received.

Example 77 includes the subject matter of any of Examples 61-76, and wherein the scheduling policy indicates that the order of execution for commands received by the target hardware queue manager is based on a round robin.

Example 78 includes the subject matter of any of Examples 61-77, and wherein the scheduling policy indicates that the order of execution for commands received by the target hardware queue manager is based on a weighted round robin.

Example 79 includes the subject matter of any of Examples 61-78, and wherein the scheduling policy indicates that the order of execution for commands received by the target hardware queue manager based on preemptive priority.

Example 80 includes the subject matter of any of Examples 61-79, and further including means for determining, for each of the hardware queue managers, data indicative of a latency of a dequeue command from the destination processor core to the respective hardware queue manager; and means for determining, based on the data, a desired target hardware queue manager.

Example 81 includes the subject matter of any of Examples 61-80, and further including means for determining whether the desired target hardware queue manager is the target hardware queue manager; and means for migrating, in response to a determination that the desired target hardware queue manager is not the target hardware queue manger, data associated with a queue data structure of the target hardware queue manager from the target hardware queue manager to the desired target hardware queue manager.

Example 82 includes the subject matter of any of Examples 61-81, and wherein migrating data comprises updating a queue mapping table in a memory of the compute device.

Example 83 includes the subject matter of any of Examples 61-82, and further including means for determining, for each of the plurality of hardware queue managers, data indicative of an average latency of a dequeue command from each of the consuming processor cores, wherein the means for determining the desired target hardware queue manager comprises means for determining, based on the data indicative of the average latency, a desired target hardware queue manager.

Example 84 includes the subject matter of any of Examples 61-83, and further including means for determining, for each of the consuming processor cores, data indicative of a frequency the plurality of instructions cause the respective consuming core to generate a dequeue command; means for determining, for each of the plurality of hardware queue managers and based on the data indicative of the frequency for each of the consuming cores to generate a dequeue command, data indicative of a weighted average latency of a dequeue command from each of the consuming processor cores, wherein the means for determining the desired target hardware queue manager comprises means for determining, based on the data indicative of the weighted average latency, a desired target hardware queue manager.

Example 85 includes the subject matter of any of Examples 61-84, and further including means for determining at least two consuming processor cores of the plurality of processing cores, wherein the plurality of instructions cause each of the at least two consuming processor cores to dequeue from the same virtual queue address; means for determining, for each of the at least two consuming processor cores and for each of the plurality of hardware queue managers, data indicative of a latency of a dequeue command from the respective consuming processor core to the respective hardware queue manager; and means for determining, based on the data indicative of the latency, a desired target hardware queue manager.

Example 86 includes the subject matter of any of Examples 61-85, and further including means for determining, for each of a plurality of virtual queue addresses, a physical queue address associated with a hardware queue manager of the compute device; and means for configuring a queue mapping table in a memory of the compute device, wherein the queue mapping table indicates the corresponding physical queue address for each of the plurality of virtual queue addresses.

Example 87 includes the subject matter of any of Examples 61-86, and wherein the queue mapping table comprises authorization data associated with each of the plurality of virtual queue addresses.

Example 88 includes the subject matter of any of Examples 1-32, and wherein each of the plurality of processor cores and each of the plurality of hardware queue managers are incorporated on a system-on-a-chip.

Example 89 includes the subject matter of any of Examines 1-32 and 88, wherein a memory is incorporated on the system-on-a-chip.

The invention claimed is:
1. A processor comprising:
a plurality of processor cores;
a plurality of hardware queue managers;
interconnect circuitry to connect each hardware queue manager of the plurality of hardware queue managers to each processor core of the plurality of processor cores; and
a plurality of queue mapping units, wherein each of the plurality of processor cores is associated with a different queue mapping unit of the plurality of queue mapping units and each of the plurality of queue mapping units is associated with a different processor core of the plurality of processor cores,
wherein each hardware queue manager of the plurality of hardware queue managers comprises:
enqueue circuitry to store data received from a processor core of the plurality of processor cores in a data queue associated with the respective hardware queue manager in response to an enqueue command generated by the processor core, wherein the enqueue command identifies the respective hardware queue manager;
dequeue circuitry to retrieve the data from the data queue associated with the respective hardware queue manager in response to a dequeue command generated by a processor core of the plurality of processor cores, wherein the dequeue command identifies the respective hardware queue manager; and
wherein each queue mapping unit of the plurality of queue mapping units is configured to:
receive a virtual queue address from the corresponding processor core;
translate the virtual queue address to a physical queue address; and
provide the physical queue address to the corresponding processor core.

2. The processor of claim 1,
wherein the enqueue command comprises a physical queue address of the respective hardware queue manager,
wherein to store the data comprises to add the data to a queue data structure in queue storage circuitry of the respective hardware queue manager based on the physical queue address,
wherein the dequeue command further comprises the physical queue address, and
wherein to retrieve the data from the data queue comprises to remove the data from the queue data structure of the queue storage circuitry based on the physical queue address.

3. The processor of claim 2,
wherein each hardware queue manager of the plurality of hardware queue managers further comprises a request buffer, wherein the request buffer is to:
store the data and the physical queue address in response to the enqueue command generated by the processor core before the data is stored by the enqueue circuitry
store the physical queue address in response to the dequeue command generated by the processor core before the data is retrieved by the dequeue circuitry.

4. The processor of claim 3, wherein the enqueue circuitry of each of the plurality of hardware queue managers is further to:
determine, in response to the enqueue command, whether space is available in the request buffer; and
drop the enqueue command in response to a determination that there is not space available in the request buffer.

5. The processor of claim 1, wherein each queue mapping unit of the plurality of queue mapping units comprises a queue translation lookaside buffer, wherein to translate the virtual queue address to the physical queue address comprises to:
determine whether a physical queue address corresponding to the virtual queue address is in the corresponding queue translation lookaside buffer;
access, in response to a determination that the physical queue address is not in the corresponding queue translation lookaside buffer, a queue mapping table in a memory associated with the processor for the physical queue address;
receive a response from the queue mapping table;
determine whether the response indicates the physical queue address;
update, in response to a determination that the response indicates the physical queue address, the queue translation lookaside buffer; and
provide, in response to a determination that the response does not indicate the physical queue address, an interrupt to the corresponding processor core.

6. The processor of claim 1, wherein each hardware queue manager of the plurality of hardware queue managers further comprises queue migration circuitry to:
receive a signal indicating a queue migration, the signal comprising a source physical queue address of the hardware queue manager and a destination physical queue address of a destination hardware queue manager of the plurality of hardware queue managers; and
forward, in response to the signal, entries of a queue data structure associated with the source physical queue address to the destination hardware queue manager.

7. The processor of claim 1, wherein:
the enqueue circuitry of each of the plurality of hardware queue managers is further to store additional data received from a hardware component different from the processor in the data queue in response to an additional enqueue command generated by the hardware component, wherein the additional enqueue command identifies the respective hardware queue manger of the plurality of hardware queue managers; and
the dequeue circuitry of each of the plurality of hardware queue managers is further to retrieve the additional data from the data queue in response to an additional dequeue command generated by the hardware component, wherein the additional dequeue command identifies the respective hardware queue manager of the plurality of hardware queue managers.

8. The processor of claim 1, wherein the plurality of processor cores comprises at least 32 processor cores.

9. The processor of claim 1, wherein each of the plurality of processor cores and each of the plurality of hardware queue managers are incorporated on a system-on-a-chip.

10. The processor of claim 9, wherein a memory is incorporated on the system-on-a-chip.

11. A method for using a distributed hardware queue manager, the method comprising:
enqueuing queue data from a source processor core of a plurality of processor cores of a processor of a compute device to a target hardware queue manager of a plurality of hardware queue managers of the processor with use of a queue mapping unit of a plurality of queue mapping units, wherein each of the plurality of processor cores is associated with a different queue mapping unit of the plurality of queue mapping units and each of the plurality of queue mapping units is associated with a different processor core of the plurality of processor cores;
dequeuing the queue data from the target hardware queue manager to a destination processor core of the plurality of processor cores with use of the queue mapping unit of the plurality of queue mapping units; and
wherein each queue mapping unit of the plurality of queue mapping units is configured to:
receive a virtual queue address from the corresponding processor core;
translate the virtual queue address to a physical queue address; and
provide the physical queue address to the corresponding processor core.

12. The method of claim 11, further comprising:
determining parameters for the target hardware queue manger, wherein the parameters indicate a size of an entry for each of a plurality of queue data structures of the target hardware queue manager; and
configuring the target hardware queue manager based on the parameters.

13. The method of claim 12, wherein the parameters indicate a scheduling policy of the target hardware queue manager, wherein the scheduling policy of the target hardware queue manager indicates the order of execution for commands received by the target hardware queue manager.

14. The method of claim 12, further comprising:
determining, for each of the hardware queue managers, data indicative of a latency of a dequeue command from the destination processor core to the respective hardware queue manager; and
determining, based on the data, a desired target hardware queue manager.

15. The method of claim 14, further comprising:
   determining whether the desired target hardware queue manager is the target hardware queue manager; and
   migrating, in response to a determination that the desired target hardware queue manager is not the target hardware queue manger, data associated with a queue data structure of the target hardware queue manager from the target hardware queue manager to the desired target hardware queue manager.

16. The method of claim 15, wherein migrating data comprises updating a queue mapping table in a memory of the compute device.

17. The method of claim 12, further comprising:
   determining at least two consuming processor cores of the plurality of processing cores, wherein the plurality of instructions cause each of the at least two consuming processor cores to dequeue from the same virtual queue address;
   determining, for each of the at least two consuming processor cores and for each of the plurality of hardware queue managers, data indicative of a latency of a dequeue command from the respective consuming processor core to the respective hardware queue manager; and
   determining, based on the data indicative of the latency, a desired target hardware queue manager.

18. The method of claim 11, further comprising:
   determining, for each of a plurality of virtual queue addresses, a physical queue address associated with a hardware queue manager of the compute device; and
   configuring a queue mapping table in a memory of the compute device, wherein the queue mapping table indicates the corresponding physical queue address for each of the plurality of virtual queue addresses.

19. One or more non-transitory computer-readable storage media comprising a plurality of instructions stored thereon that, when executed, cause a compute device to:
   enqueue queue data from a source processor core of a plurality of processor cores of a processor of the compute device to a target hardware queue manager of a plurality of hardware queue managers of the processor with use of a queue mapping unit of a plurality of queue mapping units, wherein each of the plurality of processor cores is associated with a different queue mapping unit of the plurality of queue mapping units and each of the plurality of queue mapping units is associated with a different processor core of the plurality of processor cores;
   dequeue the queue data from the target hardware queue manager to a destination processor core of the plurality of processor cores with use of the queue mapping unit of the plurality of queue mapping units; and
   wherein each queue mapping unit of the plurality of queue mapping units is configured to:
   receive a virtual queue address from the corresponding processor core;
   translate the virtual queue address to a physical queue address; and
   provide the physical queue address to the corresponding processor core.

20. The one or more non-transitory computer-readable storage media of claim 19, wherein the plurality of instructions further cause the compute device to:
   determine parameters for the target hardware queue manger, wherein the parameters indicate a size of an entry for each of a plurality of queue data structures of the target hardware queue manager; and
   configure the target hardware queue manager based on the parameters.

21. The one or more non-transitory computer-readable storage media of claim 20, wherein the parameters indicate a scheduling policy of the target hardware queue manager, wherein the scheduling policy of the target hardware queue manager indicates the order of execution for commands received by the target hardware queue manager.

22. The one or more non-transitory computer-readable storage media of claim 20, wherein the plurality of instructions further cause the compute device to:
   determine, for each of the hardware queue managers, data indicative of a latency of a dequeue command from the destination processor core to the respective hardware queue manager; and
   determine, based on the data, a desired target hardware queue manager.

23. The one or more non-transitory computer-readable storage media of claim 22, wherein the plurality of instructions further cause the compute device to:
   determine whether the desired target hardware queue manager is the target hardware queue manager; and
   migrate, in response to a determination that the desired target hardware queue manager is not the target hardware queue manger, data associated with a queue data structure of the target hardware queue manager from the target hardware queue manager to the desired target hardware queue manager.

24. The one or more non-transitory computer-readable storage media of claim 23, wherein to migrate data comprises to update a queue mapping table in a memory of the compute device.

25. The one or more non-transitory computer-readable storage media of claim 20, wherein the plurality of instructions further cause the compute device to:
   determine at least two consuming processor cores of the plurality of processing cores, wherein the plurality of instructions cause each of the at least two consuming processor cores to dequeue from the same virtual queue address;
   determine, for each of the at least two consuming processor cores and for each of the plurality of hardware queue managers, data indicative of a latency of a dequeue command from the respective consuming processor core to the respective hardware queue manager; and
   determine, based on the data indicative of the latency, a desired target hardware queue manager.

26. The one or more non-transitory computer-readable storage media of claim 19, wherein the plurality of instructions further cause the compute device to:
   determine, for each of a plurality of virtual queue addresses, a physical queue address associated with a hardware queue manager of the compute device;
   configure a queue mapping table in a memory of the compute device, wherein the queue mapping table indicates the corresponding physical queue address for each of the plurality of virtual queue addresses.

27. A compute device comprising:
   means for enqueuing queue data from a source processor core of a plurality of processor cores of a processor of the compute device to a target hardware queue manager of a plurality of hardware queue managers of the processor with use of a queue mapping unit of a plurality of queue mapping units, wherein each of the plurality of processor cores is associated with a different queue mapping unit of the plurality of queue mapping units and each of the plurality of queue mapping units is associated with a different processor core of the plurality of processor cores;

means for dequeuing the queue data from the target hardware queue manager to a destination processor core of the plurality of processor cores with use of the queue mapping unit of the plurality of queue mapping units; and wherein each queue mapping unit of the plurality of queue mapping units is configured to:

receive a virtual queue address from the corresponding processor core;

translate the virtual queue address to a physical queue address; and provide the physical queue address to the corresponding processor core.

28. The compute device of claim 27, further comprising:
means for determining parameters for the target hardware queue manger, wherein the parameters indicate a size of an entry for each of a plurality of queue data structures of the target hardware queue manager; and
means for configuring the target hardware queue manager based on the parameters.

29. The compute device of claim 27, further comprising:
means for determining, for each of a plurality of virtual queue addresses, a physical queue address associated with a hardware queue manager of the compute device; and
means for configuring a queue mapping table in a memory of the compute device, wherein the queue mapping table indicates the corresponding physical queue address for each of the plurality of virtual queue addresses.

* * * * *